United States Patent
Kawamura

(10) Patent No.: US 9,726,868 B2
(45) Date of Patent: *Aug. 8, 2017

(54) ZOOM LENS AND IMAGE PICKUP APPARATUS USING THE SAME

(71) Applicant: OLYMPUS CORPORATION, Tokyo (JP)

(72) Inventor: Kazuteru Kawamura, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 57 days.

This patent is subject to a terminal disclaimer.

(21) Appl. No.: 14/700,629

(22) Filed: Apr. 30, 2015

(65) Prior Publication Data

US 2015/0234164 A1    Aug. 20, 2015

Related U.S. Application Data

(62) Division of application No. 13/911,590, filed on Jun. 6, 2013, now Pat. No. 9,052,496.

(30) Foreign Application Priority Data

Oct. 30, 2012 (JP) .................. 2012-238778

(51) Int. Cl.
*G02B 15/14* (2006.01)
*G02B 15/15* (2006.01)
(Continued)

(52) U.S. Cl.
CPC ......... *G02B 15/163* (2013.01); *G02B 13/006* (2013.01); *G02B 13/009* (2013.01);
(Continued)

(58) Field of Classification Search
CPC ...... G02B 13/0045; G02B 9/60; G02B 15/20; G02B 13/009; G02B 5/005;
(Continued)

(56) References Cited

U.S. PATENT DOCUMENTS 8,488,251 B2    7/2013    Saito
8,520,318 B2    8/2013    Hosoi et al.
(Continued)

FOREIGN PATENT DOCUMENTS

JP    2003-287681    10/2003
JP    2010-191199    9/2010
(Continued)

OTHER PUBLICATIONS

Japanese Office Action dated Aug. 17, 2016, issued in based Japanese Patent Application No. 2012-238778.

*Primary Examiner* — Evelyn A Lester
(74) *Attorney, Agent, or Firm* — Andrews Kurth Kenyon LLP

(57) ABSTRACT

The zoom lens has an aperture stop arranged between the second lens unit and the fourth lens unit. During zooming from the wide angle end to the telephoto end, the distances between the lens units vary in such a way that the distance between the first lens unit and the second lens unit is larger at the telephoto end than at the wide angle end, the distance between the second lens unit and the third lens unit is smaller at the telephoto end than at the wide angle end, and the distance between the fourth lens unit and the fifth lens unit is larger at the telephoto end than at the wide angle end. The zoom lens satisfies the following conditional expression (1):

$$3.5 \leq LTL_w/IH_I \leq 8.9 \qquad (1).$$

29 Claims, 19 Drawing Sheets

(51) Int. Cl.
  *G02B 3/02* (2006.01)
  *G02B 13/18* (2006.01)
  *G02B 15/163* (2006.01)
  *G02B 15/20* (2006.01)
  *G02B 27/00* (2006.01)
  *G02B 13/00* (2006.01)
  *G02B 9/60* (2006.01)
  *G02B 5/00* (2006.01)

(52) U.S. Cl.
  CPC ......... *G02B 15/20* (2013.01); *G02B 27/0025* (2013.01); *G02B 5/005* (2013.01); *G02B 9/60* (2013.01); *G02B 13/0015* (2013.01); *G02B 13/0045* (2013.01); *G02B 15/15* (2013.01)

(58) Field of Classification Search
  CPC .. G02B 13/0015; G02B 15/15; G02B 15/163; G02B 27/0025; G02B 13/006
  USPC ................ 359/676, 683–686, 714, 740, 766
  See application file for complete search history.

(56) References Cited

U.S. PATENT DOCUMENTS

| | | |
|---|---|---|
| 8,537,249 B2 | 9/2013 | Imaoka et al. |
| 8,542,449 B2 | 9/2013 | Yamanaka et al. |
| 8,593,735 B2 | 11/2013 | Ichikawa |
| 2008/0304161 A1* | 12/2008 | Souma ..................... G02B 9/60 359/683 |
| 2011/0026133 A1* | 2/2011 | Fujisaki ............... G02B 13/009 359/683 |
| 2011/0080653 A1* | 4/2011 | Kimura ................ G02B 15/173 359/683 |
| 2011/0149118 A1 | 6/2011 | Misaka |
| 2012/0087017 A1* | 4/2012 | Fujisaki ............... G02B 13/009 359/687 |
| 2012/0229693 A1 | 9/2012 | Matsumura |
| 2012/0287312 A1 | 11/2012 | Kimura |
| 2012/0327272 A1 | 12/2012 | Bito |
| 2013/0050535 A1 | 2/2013 | Kuroda et al. |
| 2013/0242142 A1 | 9/2013 | Matsumura |

FOREIGN PATENT DOCUMENTS

| | | |
|---|---|---|
| JP | 2011-232620 A | 11/2011 |
| JP | 2011-237588 A | 11/2011 |
| JP | 2011-247964 A | 12/2011 |
| JP | 2012-047814 A | 3/2012 |
| JP | 2012-083602 A | 4/2012 |
| JP | 2012-198504 A | 10/2012 |
| JP | 2013-218291 A | 10/2013 |

* cited by examiner

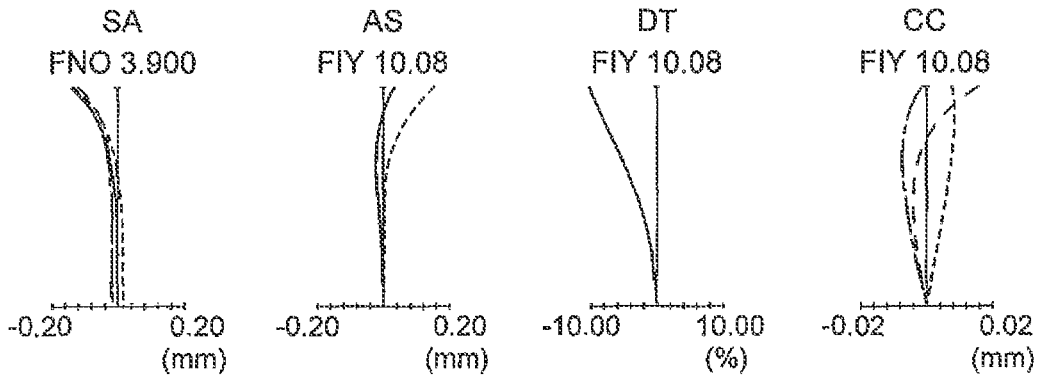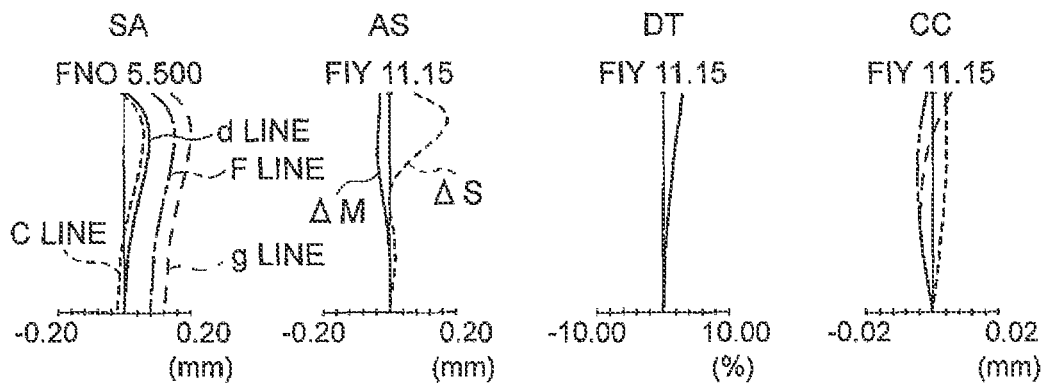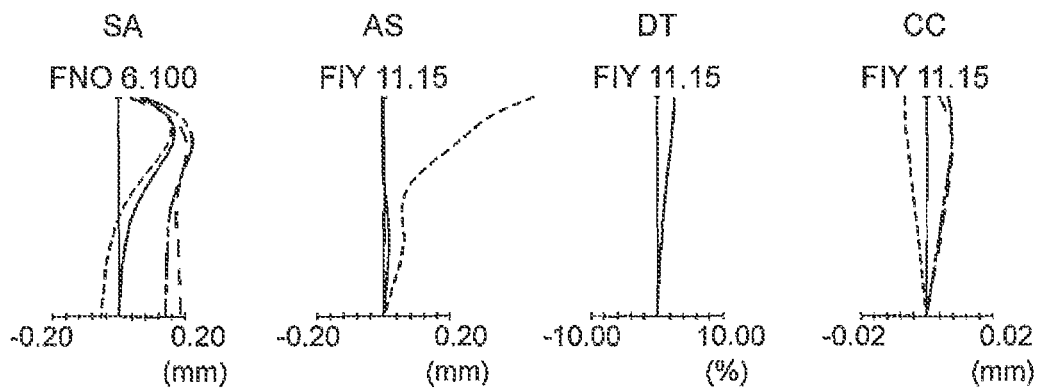

SA
FNO 3.900

-0.20  0.20
(mm)

AS
FIY 10.41

-0.20  0.20
(mm)

DT
FIY 10.41

-10.00  10.00
(%)

CC
FIY 10.41

-0.02  0.02
(mm)

SA
FNO 5.500

-0.20  0.20
(mm)

AS
FIY 11.45

-0.20  0.20
(mm)

DT
FIY 11.45

-10.00  10.00
(%)

CC
FIY 11.45

-0.02  0.02
(mm)

SA
FNO 6.100

-0.20  0.20
(mm)

AS
FIY 11.45

-0.20  0.20
(mm)

DT
FIY 11.45

-10.00  10.00
(%)

CC
FIY 11.45

-0.02  0.02
(mm)

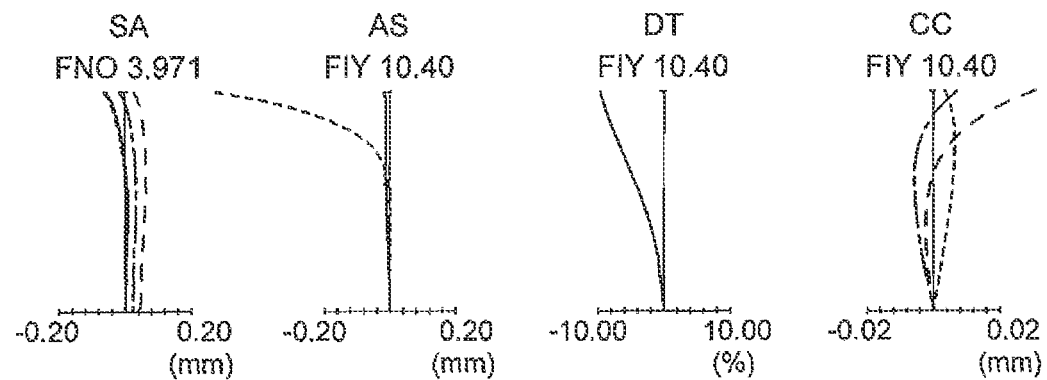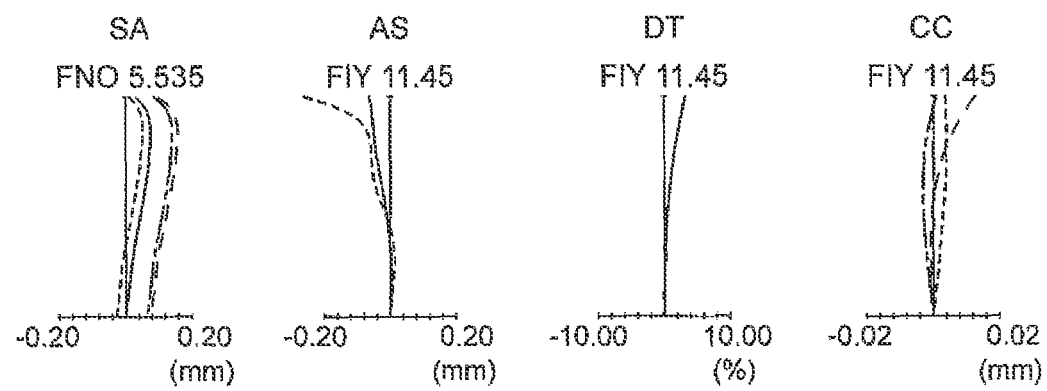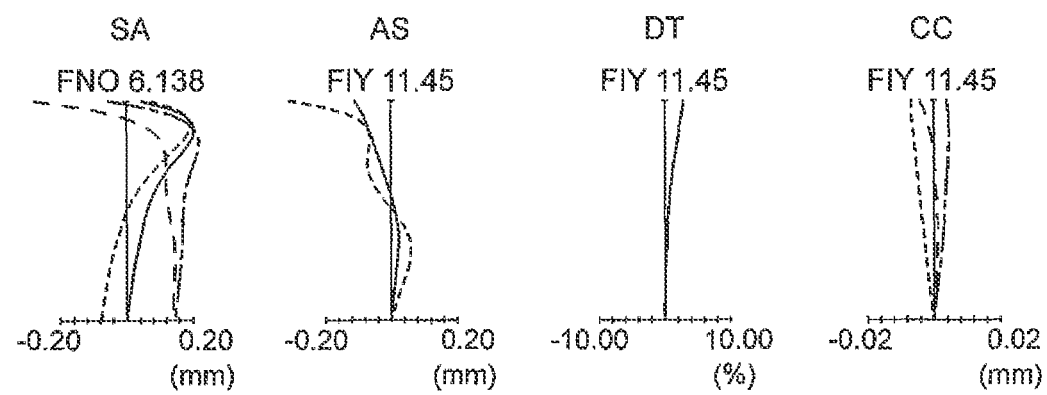

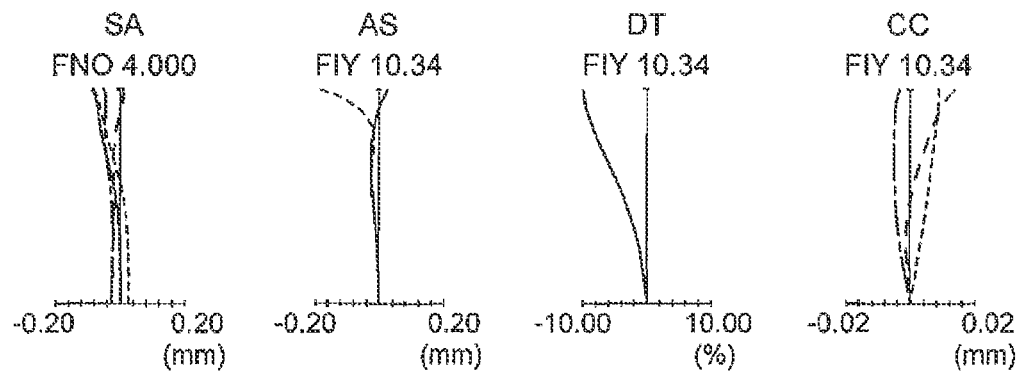
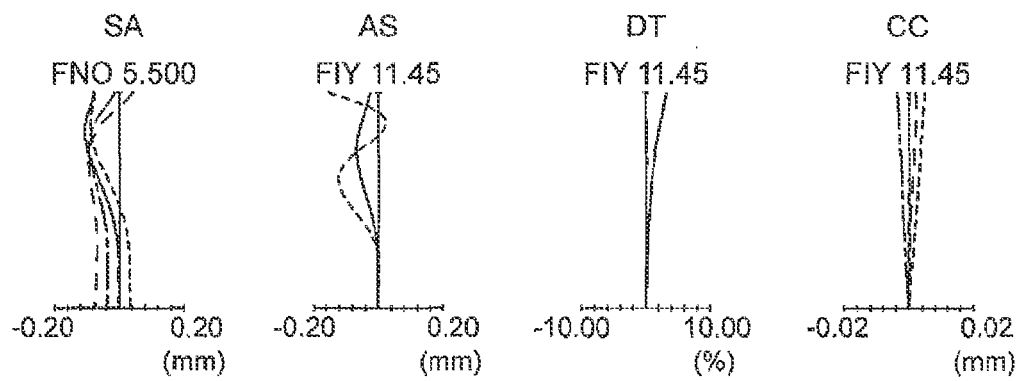
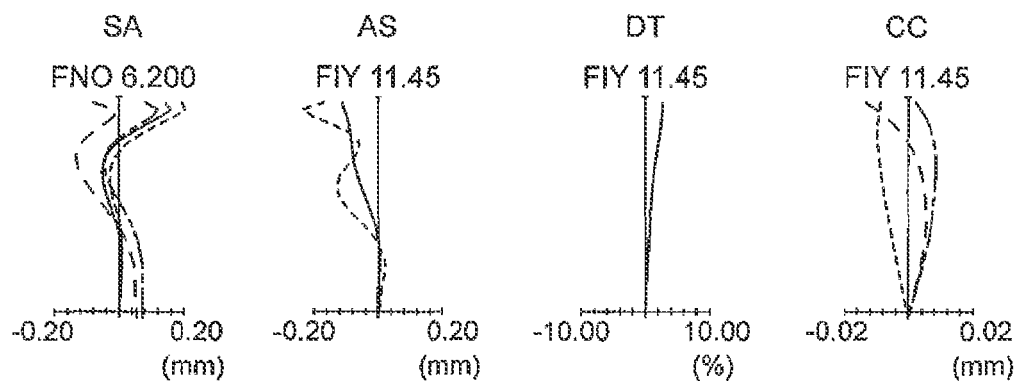

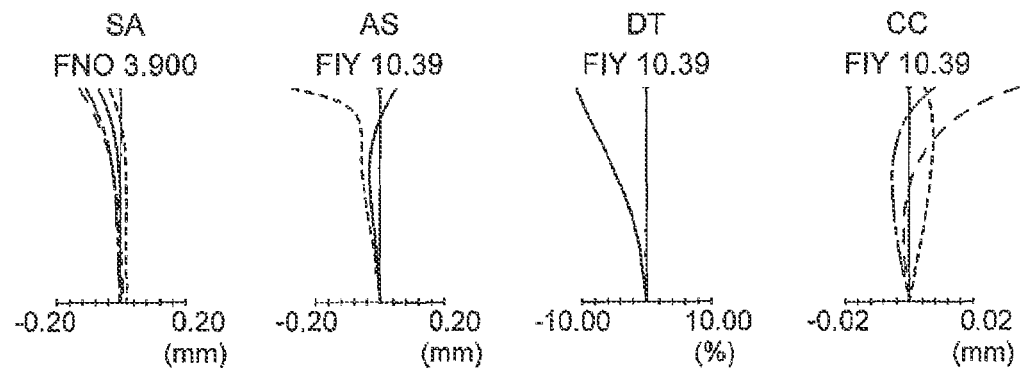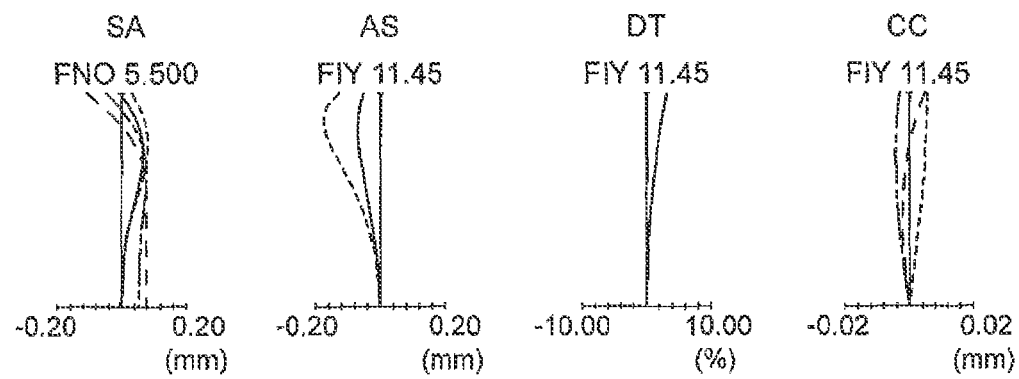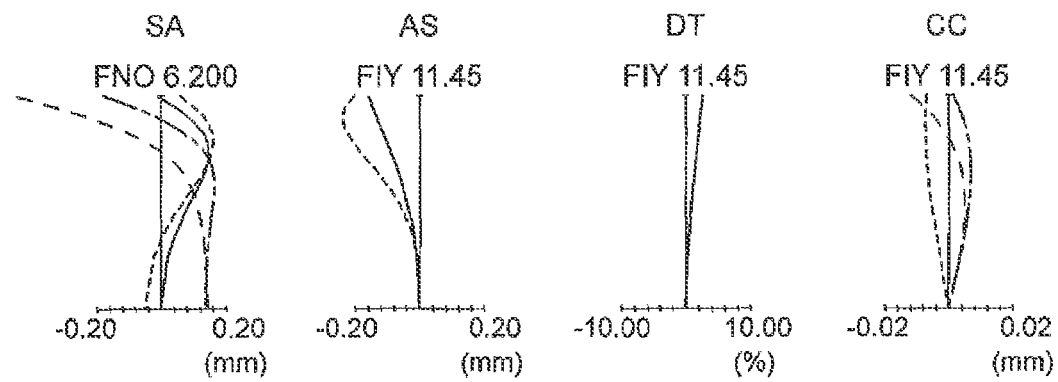

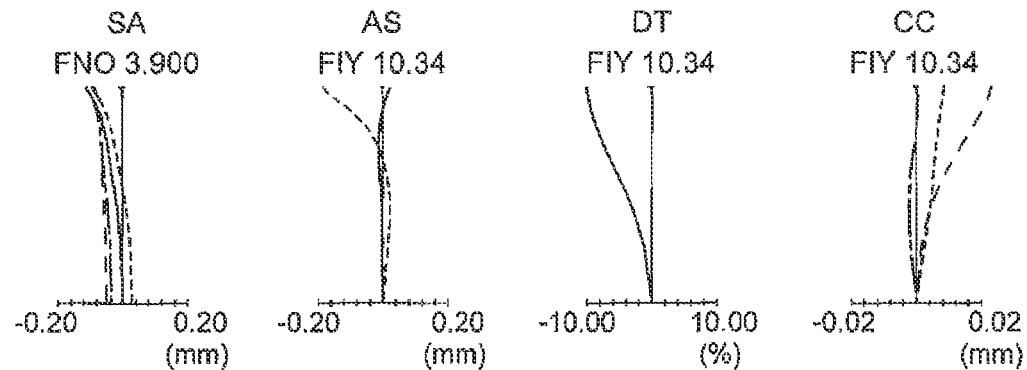
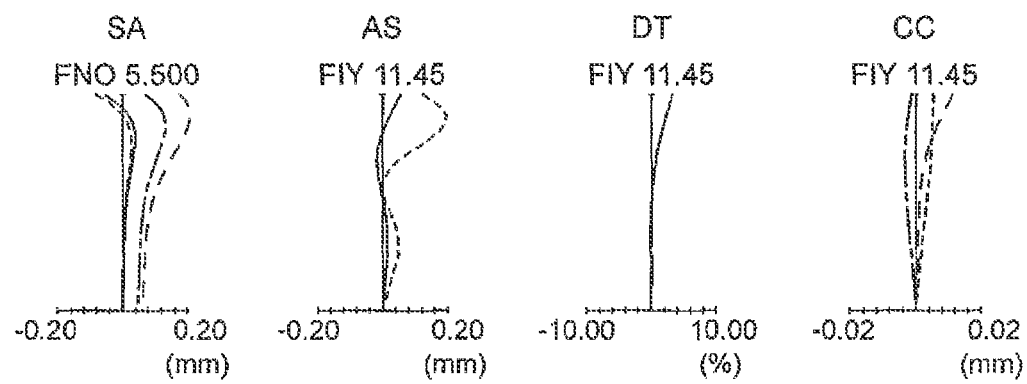
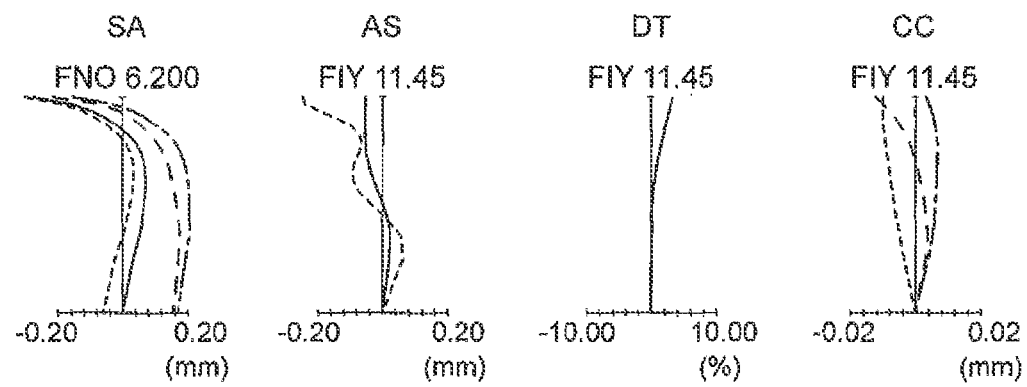

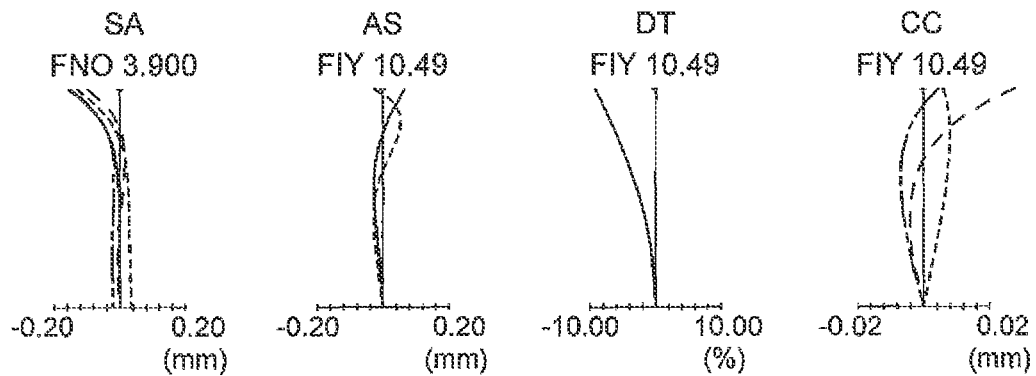
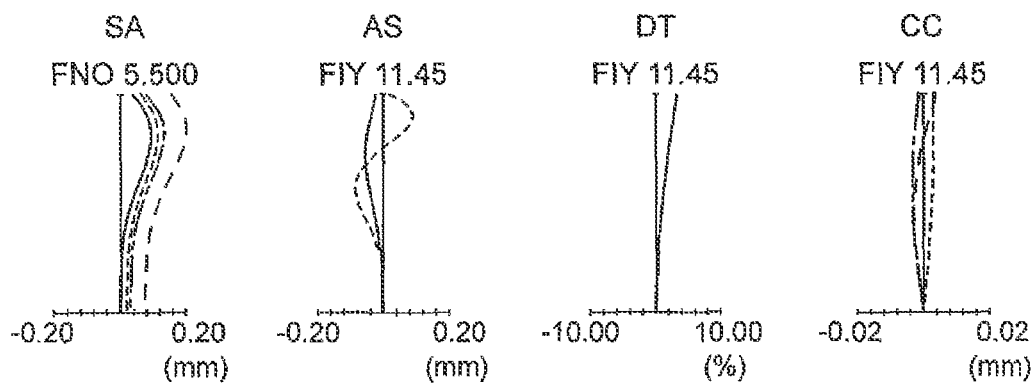
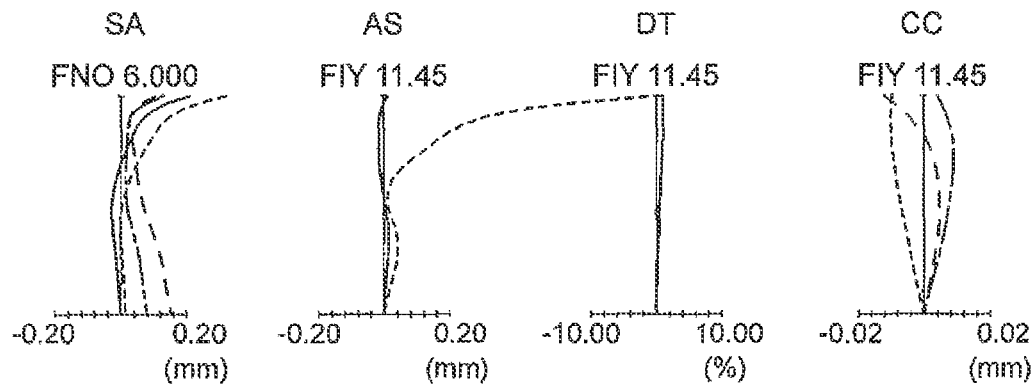

ZOOM LENS AND IMAGE PICKUP APPARATUS USING THE SAME

CROSS-REFERENCE TO RELATED APPLICATION

The present application is a divisional application of U.S. patent application Ser. No. 13/911,590 filed on Jun. 6, 2013, which is based upon and claims the benefit of priority from the prior Japanese Patent Application No. 2012-238778 filed on Oct. 30, 2012; the entire contents of which are incorporated herein by reference.

BACKGROUND OF THE INVENTION

Field of the Invention

The present invention relates to a zoom lens and an image pickup apparatus equipped with a zoom lens.

Description of the Related Art

In recent years, reduction in the size, weight, and manufacturing cost of cameras using an electronic image pickup element, such as digital cameras, have been needed. To achieve reduction in the size, weight, and manufacturing cost of such cameras, it is necessary to reduce the size of the camera body and the optical system.

On the other hand, there are needs for wide-angle shooting such as the shooting of a large structure or building or the taking of a souvenir photograph in an extensive background. In addition, people wish to take wide-angle photographs and telephoto photographs using only one lens. As lenses that meet such needs in shooting, wide angle zoom lenses having a half angle of view larger than 37 degrees and a zoom ratio higher than 4.5 provide a convenient view angle range, enabling shooting in wide variety of situations.

As a lens configuration that can achieve a relatively wide angle of view and high zoom ratio, a zoom lens including, in order from the object side, a first lens unit having a positive refractive power, a second lens unit having a negative refractive power, a third lens unit having a positive refractive power, a fourth lens unit having a negative refractive power, and a fifth lens unit having a positive refractive power has been known, as disclosed in Japanese Patent Application Laid-Open Nos. 2010-191199 and 2003-287681.

SUMMARY OF THE INVENTION

A zoom lens according to a first aspect of the present invention comprises, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power, wherein the zoom lens has an aperture stop arranged between the second lens unit and the fourth lens unit, during zooming from the wide angle end to the telephoto end the distances between the lens units vary in such a way that the distance between the first lens unit and the second lens unit is larger at the telephoto end than at the wide angle end, the distance between the second lens unit and the third lens unit is smaller at the telephoto end than at the wide angle end, and the distance between the fourth lens unit and the fifth lens unit is larger at the telephoto end than at the wide angle end, and the zoom lens satisfies the following conditional expression (1):

$$3.5 \le LTL_w/IH_t \le 8.9 \qquad (1),$$

where $LTL_w$ is the sum of the distance on the optical axis between the refractive surface closest to the object side and the refractive surface closest to the image side among the refractive surfaces in the zoom lens and the equivalent air distance of the back focus at the wide angle end in the state in which the zoom lens is focused at infinity on the optical axis, and $IH_t$ is the largest image height at the telephoto end in the state in which the zoom lens is focused at infinity on the optical axis.

A zoom lens according to a second aspect of the present invention comprises, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power, wherein the zoom lens has an aperture stop arranged between the second lens unit and the fourth lens unit, during zooming from the wide angle end to the telephoto end the distances between the lens units vary in such a way that the distance between the first lens unit and the second lens unit is larger at the telephoto end than at the wide angle end, the distance between the second lens unit and the third lens unit is smaller at the telephoto end than at the wide angle end, and the distance between the fourth lens unit and the fifth lens unit is larger at the telephoto end than at the wide angle end, the third lens unit includes a negative lens and a plurality of positive lenses, and the zoom lens satisfies the following conditional expression (2):

$$3.5 \le LTL_w/IH_t \le 10.0 \qquad (2),$$

where $LTL_w$ is the sum of the distance on the optical axis between the refractive surface closest to the object side and the refractive surface closest to the image side among the refractive surfaces in the zoom lens and the equivalent air distance of the back focus at the wide angle end in the state in which the zoom lens is focused at infinity on the optical axis, and $IH_t$ is the largest image height at the telephoto end in the state in which the zoom lens is focused at infinity on the optical axis.

A zoom lens according to a third aspect of the present invention comprises, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power, wherein the zoom lens has an aperture stop arranged between the second lens unit and the fourth lens unit, during zooming from the wide angle end to the telephoto end the distances between the lens units vary in such a way that the distance between the first lens unit and the second lens unit is larger at the telephoto end than at the wide angle end, the distance between the second lens unit and the third lens unit is smaller at the telephoto end than at the wide angle end, and the distance between the fourth lens unit and the fifth lens unit is larger at the telephoto end than at the wide angle end, the third lens unit includes two lenses cemented together with the cemented surface having a negative refractive power, an object side positive lens located closer to the object side than the two lenses, and an image side lens located closer to the image side than the two lenses, the composite refractive power of a portion from the object side surface of the third lens unit to the image side surface of a lens located immediately before (i.e. on the object side of) the two lenses is positive, the image side lens has a lens surface having a positive refractive power, and the zoom lens satisfies the following conditional expression (3):

$$0.5 \le |f_2/IH_t| 1.3 \qquad (3),$$

where $f_2$ is the focal length of the second lens unit, and $IH_t$ is the largest image height of the zoom lens at the telephoto end in the state in which the zoom lens is focused at infinity on the optical axis.

A zoom lens according to a fourth aspect of the present invention comprises, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power, wherein the zoom lens has an aperture stop arranged between the second lens unit and the fourth lens unit, during zooming from the wide angle end to the telephoto end the distances between the lens units vary in such a way that the distance between the first lens unit and the second lens unit is larger at the telephoto end than at the wide angle end, the distance between the second lens unit and the third lens unit is smaller at the telephoto end than at the wide angle end, and the distance between the fourth lens unit and the fifth lens unit is larger at the telephoto end than at the wide angle end, the third lens unit includes two lenses cemented together with the cemented surface having a negative refractive power, an object side positive lens located closer to the object side than the two lenses, and an image side lens located closer to the image side than the two lenses, the composite refractive power of a portion from the object side surface of the third lens unit to the image side surface of a lens located immediately before (i.e. on the object side of) the two lenses is positive, the image side lens has a lens surface having a positive refractive power, and the zoom lens satisfies the following conditional expression (4):

$$0.7 \le f_3/IH_t \le 2.0 \qquad (4),$$

where $f_3$ is the focal length of the third lens unit, and $IH_t$ is the largest image height of the zoom lens at the telephoto end in the state in which the zoom lens is focused at infinity on the optical axis.

A zoom lens comprising, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power, wherein the zoom lens has an aperture stop arranged between the second lens unit and the fourth lens unit, during zooming from the wide angle end to the telephoto end the distances between the lens units vary in such a way that the distance between the first lens unit and the second lens unit is larger at the telephoto end than at the wide angle end, the distance between the second lens unit and the third lens unit is smaller at the telephoto end than at the wide angle end, and the distance between the fourth lens unit and the fifth lens unit is larger at the telephoto end than at the wide angle end, the third lens unit includes two lenses cemented together with the cemented surface having a negative refractive power, an object side positive lens located closer to the object side than the two lenses, and an image side lens located closer to the image side than the two lenses, the composite refractive power of a portion from the object side surface of the third lens unit to the image side surface of a lens located immediately before (i.e. on the object side of) the two lenses is positive, the image side lens has a lens surface having a positive refractive power, and the zoom lens satisfies the following conditional expression (5):

$$0.6 \le f_3/f_w \le 1.6 \qquad (5),$$

where $f_3$ is the focal length of the third lens unit, and $f_w$ is the focal length of the zoom lens at the wide angle end in the state in which the zoom lens is focused at infinity on the optical axis.

An image pickup apparatus according to the present invention comprises a zoom lens according to any one of the above-described aspects and an image pickup element arranged on the image side of the zoom lens to convert an image formed by the zoom lens into an electric signal.

BRIEF DESCRIPTION OF THE DRAWINGS

FIG. 1A shows the state at the wide angle end, FIG. 1B shows the state in an intermediate focal length state, and FIG. 1C shows the state at the telephoto end;

FIG. 2A shows the state at the wide angle end, FIG. 2B shows the state in an intermediate focal length state, and FIG. 2C shows the state at the telephoto end;

FIG. 3A shows the state at the wide angle end, FIG. 3B shows the state in an intermediate focal length state, and FIG. 3C shows the state at the telephoto end;

FIG. 4A shows the state at the wide angle end, FIG. 4B shows the state in an intermediate focal length state, and FIG. 4C shows the state at the telephoto end;

FIG. 5A shows the state at the wide angle end, FIG. 5B shows the state in an intermediate focal length state, and FIG. 5C shows the state at the telephoto end;

FIG. 6A shows the state at the wide angle end, FIG. 6B shows the state in an intermediate focal length state, and FIG. 6C shows the state at the telephoto end;

FIG. 7A shows the state at the wide angle end, FIG. 7B shows the state in an intermediate focal length state, and FIG. 7C shows the state at the telephoto end;

FIGS. 8A, 8B, 8C, 8D, 8E, 8F, 8G, 8H, 8I, 8J, 8K, and 8L are aberration diagrams of the zoom lens according to the first embodiment in the state in which the zoom lens is focused at an object point at infinity;

FIGS. 10A, 10B, 10C, 10D, 10E, 10F, 10G, 10H, 10I, 10J, 10K, and 10L are aberration diagrams of the zoom lens according to the third embodiment in the state in which the zoom lens is focused at an object point at infinity;

FIGS. 11A, 11B, 11C, 11D, 11E, 11F, 11G, 11H, 11I, 11J, 11K, and 11L are aberration diagrams of the zoom lens according to the fourth embodiment in the state in which the zoom lens is focused at an object point at infinity;

FIGS. 12A, 12B, 12C, 12D, 12E, 12F, 12G, 12H, 12I, 12J, 12K, and 12L are aberration diagrams of the zoom lens according to the fifth embodiment in the state in which the zoom lens is focused at an object point at infinity;

FIGS. 13A, 13B, 13C, 13D, 13E, 13F, 13G, 13H, 13I, 13J, 13K, and 13L are aberration diagrams of the zoom lens according to the sixth embodiment in the state in which the zoom lens is focused at an object point at infinity;

FIGS. 14A, 14B, 14C, 14D, 14E, 14F, 14G, 14H, 14I, 14J, 14K, and 14L are aberration diagrams of the zoom lens according to the seventh embodiment in the state in which the zoom lens is focused at an object point at infinity;

DETAILED DESCRIPTION OF THE INVENTION

Figure 1A:
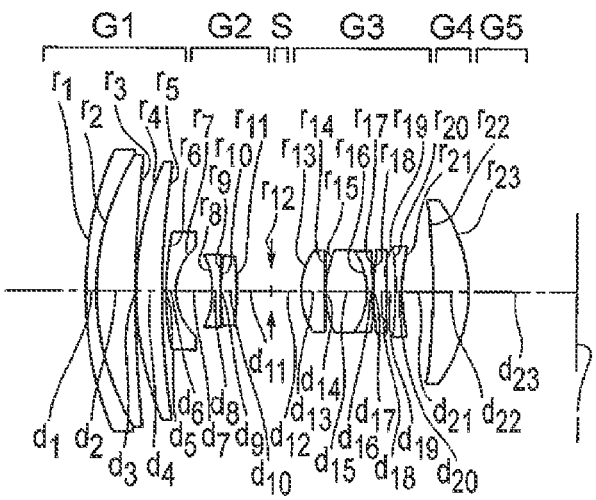
FIGS. 1A, 1B and 1C are cross sectional views taken along the optical axis, showing the configuration of a zoom lens according to a first embodiment of the present invention in the state in which the zoom lens is focused on an object point at infinity, where

In the following, embodiments of the zoom lens and the image pickup apparatus using the same according to the present invention will be described in detail with reference to the accompanying drawings. It is to be understood, however, that the present invention is by no means limited by the embodiments.

Prior to the description of the embodiments, the operation and advantages of the zoom lens according to some modes of the present invention will be described.

The zoom lens according to a mode of the present invention includes, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power, and further includes an aperture stop arranged between the second lens unit and the fourth lens unit, wherein during zooming from the wide angle end to the telephoto end, the distances between the lens units vary in such a way that the distance between the first lens unit and the second lens unit is larger at the telephoto end than at the wide angle end, the distance between the second lens unit and the third lens unit is smaller at the telephoto end than at the wide angle end, and the distance between the fourth lens unit and the fifth lens unit is larger at the telephoto end than at the wide angle end.

The above configuration is preferred for achieving a wide angle of view at the wide angle end of the zoom range, making the overall length of the zoom lens small, and achieving an adequate zoom ratio.

The above configuration facilitates symmetric refractive power arrangement design with the third lens unit located close to the aperture stop being at the center, throughout the entire zoom range. This is advantageous for maintaining satisfactory optical performance. In particular, the negative refractive power of the fourth lens unit favors reduction in the diameter and length of the portion of the zoom lens located closer to the object side than the fourth lens unit at the wide angle end.

The zoom lens according to this mode of the invention is further characterized by satisfying the following conditional expression (1):

$$3.5 \leq LTLw/IHt \leq 8.9 \tag{1},$$

where LTLw is the sum of the distance on the optical axis between the refractive surface closest to the object side and the refractive surface closest to the image side among the refractive surfaces in the zoom lens and the equivalent air distance of the back focus at the wide angle end of the zoom range in the state in which the zoom lens is focused at infinity on the optical axis, and IHt is the largest image height at the telephoto end of the zoom range in the state in which the zoom lens is focused at infinity on the optical axis.

In order to achieve a high zoom ratio, it is preferred that the lower limit of conditional expression (1) be not fell below so that a sufficiently large gap can be left between the second lens unit, which provides the main contribution to the magnification variation, and the third lens unit at the wide angle end.

It is preferred that the upper limit of conditional expression (1) be not exceeded so that the overall length of the zoom lens at the wide angle end can be made small. This is advantageous for reduction of eclipse of the flash light in the focal length range near the wide angle end. The reduction in the overall length of the zoom lens facilitates the prevention of vignetting of flash light without need for making the position of the flash unit higher or more forward. This will lead to a reduction in the size of the camera advantageously. This is also advantageous for reduction of the overall size in the case of a camera equipped with a popup flash unit, because the space for accommodating the flash unit can be made small.

A zoom lens according to a mode of the present invention is characterized in that the third lens unit includes a negative lens and a plurality of positive lenses.

Even when the third lens unit is designed to have a high refractive power in order to reduce the size of the zoom lens and to achieve an adequate zoom lens, the above-described configuration of the third lens unit will facilitate reduction of spherical aberration in the third lens unit.

As the third lens unit includes two or more positive lenses, they can be adapted to converge light in cooperation. The negative lens can be adapted to cancel aberrations generated by the two or more positive lenses. Thus, excellent optical performance can be achieved throughout the entire zoom range.

The zoom lens according to this mode is further characterized by satisfying the following conditional expression (2):

$$3.5 \leq LTLw/IHt \leq 10.0 \quad (2).$$

The advantages of the numerical limitations by conditional expression (2) are the same as those of conditional expression (1) described above.

A zoom lens according to a mode of the present invention is characterized in that the third lens unit includes two lenses cemented together with the cemented surface having a negative refractive power, an object side positive lens located closer to the object side than the aforementioned two lenses, and an image side lens located closer to the image side than the aforementioned two lenses, that the composite refractive power of the portion from the object side surface of the third lens unit to the image side surface of the lens located on the object side of the aforementioned two lenses is positive, and that the image side lens has a lens surface having a positive refractive power.

With this configuration, the third lens unit is designed to have a high refractive power, and spherical aberration and coma are made small. In the third lens unit, the composite refractive power of the partial system arranged before the two lenses that are cemented together to have a cemented surface having a negative refractive power is positive, and the rear partial system has a lens surface having a positive refractive power. This configuration favors correction of aberrations in the third lens unit. The negative refractive power of the cemented surface of the two lenses enables satisfactory correction of chromatic aberration, spherical aberration, and coma throughout the entire zoom range.

If the image side lens is a positive lens and the composite refractive power of the portion from the object side surface of the lens located immediately after (or on the image side of) the two lenses that are cemented together to have a cemented surface having a negative refractive power to the image side surface of the third lens unit is positive, the degree of symmetry of the refractive power arrangement is enhanced, further facilitating aberration correction.

On the other hand, if the composite refractive power of the portion from the object side surface of lens located on the image side of the two lenses that are cemented together to have a cemented surface having a negative refractive power to the image side surface of the third lens unit is negative, the position of the principal point of the third lens unit can be made closer to the object side, enhancing the magnification changing effect provided by change in the distance between the second lens unit and the third lens unit. This is advantageous in achieving an adequate zoom ratio.

The zoom lens according to this mode is further characterized by satisfying the following conditional expression (3):

$$0.5 \leq |f2/IHt| \leq 1.3 \quad (3),$$

where f2 is the focal length of the second lens unit, and IHt is the largest image height of the zoom lens at the telephoto end in the state in which the zoom lens is focused at infinity on the optical axis.

As the negative refractive power of the second lens unit is so low that the lower limit of conditional expression (3) is not fell below, reduction of the overall length of the zoom lens at the wide angle end is facilitated.

As the upper limit of conditional expression (3) is not exceeded, an adequate zoom ratio and wide angle of view at the wide angle end can be achieved advantageously.

The zoom lens according to the above-described mode is further characterized by satisfying the following conditional expression (4):

$$0.7 \leq f3/IHt \leq 2.0 \quad (4),$$

where f3 is the focal length of the third lens unit, and IHt is the largest image height of the zoom lens at the telephoto end in the state in which the zoom lens is focused at infinity on the optical axis.

The advantages of the numerical limitations by conditional expression (4) are the same as those of conditional expression (3) described above.

The zoom lens according to the above-described mode is further characterized by satisfying the following conditional expression (5):

$$0.6 \leq f3/fw \leq 1.6 \quad (5),$$

where f3 is the focal length of the third lens unit, and fw is the focal length of the zoom lens at the wide angle end in the state in which the zoom lens is focused at infinity on the optical axis.

As the positive refractive power of the third lens unit is so low that the lower limit of conditional expression (5) is not fell below, negative spherical aberration can readily be reduced, or the number of lenses in the third lens unit can be reduced. The reduction in the number of lenses in the third unit facilitates reduction in the overall length of the zoom lens at the wide angle end.

As the positive refractive power of the third lens unit is so high that the upper limit of conditional expression (5) is not exceeded, reduction in the overall length of the zoom lens at the wide angle end will be facilitated.

It is preferred that the zoom lens according to the above-described modes satisfy the following conditional expression (6):

$$4.0 \leq f1/fw \leq 8.5 \quad (6),$$

where f1 is the focal length of the first lens unit, and fw is the focal length of the zoom lens at the wide angle end in the state in which the zoom lens is focused at infinity on the optical axis.

If the lower limit of conditional expression (6) is not fell below, the position of the entrance pupil can be made closer to the first surface of the zoom lens. This leads to a reduction in the lens diameter in the first lens unit, facilitating reduction in the size of the lens barrel, or alternatively facilitating increase in the angle of view at the wide angle end.

If the upper limit of conditional expression (6) is not exceeded, a sufficiently high zoom ratio can readily be achieved, and/or reduction in the overall length of the zoom lens can readily be achieved over the entire zoom range.

In the zoom lens according to the above-described modes, it is preferred that the second lens unit include a positive lens that satisfies the following conditional expression (7):

$$13 \leq vd2p \leq 23 \quad (7),$$

where vd2p is the Abbe constant of the positive lens in the second lens unit with respect to the d-line, the Abbe constant vd2p being expressed by the equation "vd2p=(nd2p−1)/(nF2p−nC2p)", where nd2p is the refractive index of the positive lens with respect to the d-line, nC2p is the refractive index of the positive lens with respect to the C-line, and nF2p is the refractive index of the positive lens with respect to the F-line.

It is favorable for the second lens unit to have a sufficiently high negative refractive power in order to achieve a wide angle of view at the wide angle end and to achieve a sufficiently high zoom ratio. However, the second lens unit having a high negative refractive power tends to lead to axial chromatic aberration and chromatic aberration of magnification. Providing a positive lens in the second lens unit enables cancellation of chromatic aberration.

If the lower limit of conditional expression (7) is not fell below, overcorrection of the aforementioned chromatic aberration can be prevented.

If the upper limit of conditional expression (7) is not exceeded, insufficient correction of the aforementioned chromatic aberration can be prevented, allowing to increase the negative refractive power of the second lens unit, or leading to a decrease in the number of lenses needed to correct chromatic aberration to facilitate reduction of the overall length of the zoom lens at the wide angle end. It is desirable that the second lens unit, which tends to be necessitated to have a relatively large lens diameter, be composed of four or less lenses, more desirably three or less lenses, in order to achieve a further reduction in the overall length of the zoom lens at the wide angle end.

It is preferred that the zoom lens according to the above-described modes satisfy the following conditional expression (8):

$$-18.0\% \leq DTw \leq -6.0\% \tag{8},$$

where $DTw = \{IHw - fw \times \tan(\omega w)\} / \{fw \times \tan(\omega w)\} \times 100(\%)$, where fw is the focal length of the zoom lens at the wide angle end in the state in which the zoom lens is focused at infinity on the optical axis, IHw is the largest image height at the wide angle end in the state in which the zoom lens is focused at infinity on the optical axis, and ωw is the half angle of view of the zoom lens at the wide angle end in the state in which the zoom lens is focused at infinity on the optical axis.

It is favorable that the positive refractive power of the first lens unit and the negative refractive power of the second lens unit be high, in order to make the overall length and diameter of the zoom lens at the wide angle end small. However, increasing the negative refractive power of the second lens unit leads to negative distortion generated in the second lens unit. On the other hand, the second lens unit is a lens unit that greatly contributes to correction of curvature of field. Therefore, if distortion is allowed to be left, increasing the refractive power facilitates correction of curvature of field and size reduction of the zoom lens.

If the negative refractive power of the second lens unit is so low that the under limit of conditional expression (8) is not fell below, positive curvature of field can be made smaller.

If the negative refractive power of the second lens unit is so high that the upper limit of conditional expression (8) is not exceeded, reduction of the diameter of the zoom lens will be facilitated.

In the zoom lens according to the above-described modes, it is preferred that the second lens unit include, in order from the object side, a first negative lens component having a negative refractive power, a second negative lens component having a negative refractive power, and a positive lens component having a positive refractive power. Here, the term "lens component" refers to a lens block whose refractive surfaces that are in contact with air on the optical axis include only two surfaces or an object side surface and an image side surface.

To achieve satisfactory correction of curvature of field in the second lens unit in the zoom range near the wide angle end, it is desirable that the second lens unit have a lens component having a high negative refractive power arranged as an object side component. When the second lens unit is designed to have a high negative refractive power, the object side two negative lens components in the second lens unit are adapted not to generate large spherical aberration, and the positive lens component having a positive refractive power is arranged as an image side lens component, which can most effectively correct spherical aberration among the lens components in the second lens unit. Thus, spherical aberration can be corrected effectively.

In the zoom lens according to the above-described mode, it is preferred that the first negative lens component, the second negative lens component, and the positive lens component in the second lens unit be single lenses.

In the above-described configuration, each lens component may be constituted by a single lens, and the second lens unit may be composed of three lenses. Then, the overall thickness (or length) of the second lens unit can be made small, facilitating reduction in the overall length of the zoom lens at the wide angle end.

In the zoom lens according to the above-described mode, it is preferred that the third lens unit include four lenses, which are, in order from the object side to the image side, an object side positive lens, two lenses, and an image side lens, and that the image side lens be a positive lens.

With the above-described configuration of the third lens unit including a cemented surface having a negative refractive power, aberrations, in particular spherical aberration, coma, and chromatic aberration can be corrected effectively. In addition, the above-described four lens configuration of the third lens unit enables the third lens unit to have a sufficiently high refractive power and leads to a reduction in the overall thickness, facilitating reduction in the overall length of the zoom lens at the wide angle end.

In the zoom lens according to the above-described mode, it is preferred that the two lenses and the image side lens constitute a cemented triplet lens.

Then, the third lens unit is composed of two lens components, making the third lens unit less affected by assembly errors, contributing to the stability of performance.

In the zoom lens according to the above-described modes, it is preferred that the first lens unit include, in order from the object side to the image side, a negative lens, a first positive lens, and a second positive lens. With this configuration, curvature of field, distortion, and off-axis chromatic aberration can be excellently corrected, and the first lens unit can be designed to have a high refractive power. Furthermore, reduction in the overall length of the zoom lens can be facilitated throughout the entire zoom range.

In the zoom lens according to the above-described mode, it is preferred that the negative lens and the first positive lens in the first lens unit be cemented together.

This can reduce assembly errors of the negative lens and the first positive lens, and the refractive power can be made higher, facilitating size reduction.

In the zoom lens according to the above-described modes, it is preferred that the first lens unit include a positive lens, and all the positive lenses in the first lens unit satisfy the following conditional expression (9):

$$vdlp > 62 \tag{9},$$

where vdlp is the Abbe constant of each of the positive lenses in the first lens unit.

The longer the focal length at the telephoto end is, the more aberrations generated in the first lens unit are magnified by the succeeding lens units. The above-described configuration of the first lens unit can lead to reduction of chromatic aberration generated in the first lens unit, favoring increase in the zoom ratio.

The Abbe constant vd1p mentioned here is an Abbe constant with respect to the d-line and expressed by the equation "vd1p=(nd1p−1)/(nF1p−nC1p)", where nd1p is the refractive index of the positive lens in the first lens unit with respect to the d-line, nC1p is the refractive index of the positive lens in the first lens unit with respect to the C-line, and nF1p is the refractive index of the positive lens in the first lens unit with respect to the F-line.

In the zoom lens according to the above-described modes, it is preferred that any one of the positive lenses in the first lens unit satisfy the following conditional expression (10):

$$vdlp > 65 \tag{10}$$

where vd1p is the Abbe constant of the positive lens in the first lens unit.

Satisfying conditional expression (10) facilitates reduction of chromatic aberration, leading to an increased zoom ratio.

Advantages of placing the numerical limitation of conditional expression (10) are the same as the above-described conditional expression (9).

In the zoom lens according to the above-described modes, it is preferred that the second lens unit include a positive lens that satisfies the following conditional expression (11):

$$0.620 \leq \theta gF2p \leq 0.690 \tag{11}$$

where θgF2p=(ng2p−nF2p)/(nF2p−nC2p), where ng2p is the refractive index of the positive lens in the second lens unit with respect to the g-line, nF2p is the refractive index of the positive lens in the second lens unit with respect to the F-line, and nC2p is the refractive index of the positive lens in the second lens unit with respect to the C-line.

If the second lens unit has a high negative refractive power, axial chromatic aberration and chromatic aberration of magnification tend to be generated.

Not falling below the lower limit of conditional expression (11) is favorable for correction of the aforementioned chromatic aberration and for the second lens unit to have an adequate refractive power.

Not exceeding the upper limit of conditional expression (11) can prevent overcorrection of the aforementioned chromatic aberration.

In the zoom lens according to the above-described modes, it is preferred that the lens located immediately after (or on the image side of) the two lenses in the third lens unit have an object side surface convex toward the object side and satisfy the following conditional expression (12):

$$RR0/RCI \leq 1 \tag{12}$$

where RR0 is the paraxial radius of curvature of the object side surface of the lens located immediately after (or on the image side of) the two lenses, and RCI is the paraxial radius of curvature of the image side surface of the image side lens among the two lenses in the third lens unit.

With this configuration, the principal point of the third lens unit can readily be located closer to the object side, leading to a reduction in the overall length of the zoom lens at the wide angle end and an increase in the zoom ratio. Moreover, satisfying conditional expression (12) is favorable for reduction of high-order spherical aberration and coma.

In the zoom lens according to the above-described modes, it is preferred that the following conditional expression (13) be satisfied:

$$37° \leq \omega w \leq 50° \tag{13}$$

where ωw is the half angle of view of the zoom lens at the wide angle end in the state in which the zoom lens is focused at infinity on the optical axis.

It is preferred that the lower limit of conditional expression (13) be not fell below to allow wide variety of shooting and that the upper limit of conditional expression (13) be not exceeded so as not to make the angle of view excessively large. This condition favors both reduction of the overall length of the zoom lens at the wide angle end and reduction of diameter of the zoom lens.

It is preferred that the zoom lens according to the above-described mode further satisfy the following conditional expression (14):

$$4.5 \leq ft/fw \tag{14}$$

where fw is the focal length of the zoom lens at the wide angle end in the state in which the zoom lens is focused at infinity on the optical axis, and ft is the focal length of the zoom lens at the telephoto end in the state in which the zoom lens is focused at infinity on the optical axis.

If conditional expression (14) is satisfied, the angle of view can be varied over a wide range, enabling satisfactory shooting in various shooting situations.

In the zoom lens according to the above-described modes, it is preferred that the following conditional expression (2) be satisfied:

$$3.5 \leq LTLw/IHt \leq 10.0 \tag{2}$$

where LTLw is the sum of the distance on the optical axis between the refractive surface closest to the object side and the refractive surface closest to the image side among the refractive surfaces in the zoom lens and the equivalent air distance of the back focus at the wide angle end in the state in which the zoom lens is focused at infinity on the optical axis, and IHt is the largest image height at the telephoto end in the state in which the zoom lens is focused at infinity on the optical axis.

In the zoom lens according to the above-described modes, it is preferred that the third lens unit include a negative lens and a plurality of positive lenses.

In the zoom lens according to the above-described modes, it is preferred that the third lens unit include two lenses cemented together with the cemented surface having a negative refractive power, an object side positive lens located closer to the object side than the aforementioned two lenses, and an image side lens located closer to the image side than the aforementioned two lenses, that the composite refractive power of the portion from the object side surface of the third lens unit to the image side surface of the lens located immediately before (or on the object side of) the aforementioned two lenses be positive, and that the image side lens have a lens surface having a positive refractive power.

In the zoom lens according to the above-described modes, it is preferred that the following conditional expression (3) be satisfied:

$$0.5 \leq f2/IHt \leq 1.3 \tag{3}$$

where f2 is the focal length of the second lens unit, and IHt is the largest image height of the zoom lens at the telephoto end in the state in which the zoom lens is focused at infinity on the optical axis.

In the zoom lens according to the above-described modes, it is preferred that the following conditional expression (4) be satisfied:

$$0.7 \leq f3/IHt \leq 2.0 \qquad (4),$$

where f3 is the focal length of the third lens unit, and IHt is the largest image height of the zoom lens at the telephoto end in the state in which the zoom lens is focused at infinity on the optical axis.

In the zoom lens according to the above-described modes, it is preferred that the following conditional expression (5) be satisfied:

$$0.6 \leq f3/fw \leq 1.6 \qquad (5),$$

where f3 is the focal length of the third lens unit, and fw is the focal length of the zoom lens at the wide angle end in the state in which the zoom lens is focused at infinity on the optical axis.

In the zoom lens according to the above-described modes, it is preferred that the fifth lens unit be kept stationary during zooming from the wide angle end to the telephoto end and that the fourth lens unit move toward the image side for focusing from infinity to an object at a close distance.

Keeping the fifth lens unit stationary facilitates reduction of drive noises generated upon focusing during video shooting. The fourth lens unit can be designed to be light weighted and is suitable for use as a focusing lens unit in video shooting.

An image pickup apparatus according to a mode of the present invention includes a zoom lens according to the above-described modes and an image pickup element arranged on the image side of the zoom lens to convert an image formed by the zoom lens into an electric signal.

In the image pickup apparatus according to this mode, it is preferred that the zoom lens be the zoom lens according to the above-described mode, the lens located immediately after (or on the image side of) of the two lenses in the third lens unit have an object side surface convex toward the object side, a lens in the third lens unit located closer to the image side than the two lenses be shifted eccentrically relative to the two lenses in order to prevent image blur by stabilizing image shift caused by vibration of the zoom lens, and the zoom lens satisfy the following conditional expression (15):

$$RR0/RCI \leq 1 \qquad (15),$$

where RR0 is the paraxial radius of curvature of the object side surface of the lens located immediately after the two lenses in the third lens unit, and RCI is the paraxial radius of curvature of the image side surface of the image side lens among the two lenses in the third lens unit.

Satisfying conditional expression (15) is favorable for reduction of high-order spherical aberration and coma. The above feature facilitates reduction of deterioration in the optical performance by virtue of stabilization of image shift. Moreover, with the above feature, excellent performance can readily be achieved throughout the entire zoom range with the refractive power of the third lens unit increased, and reduction of image blur caused by vibration will be facilitated.

It is more preferred that two or more of the above-described conditions or features be satisfied. It is more preferred that one or both of the upper and lower limit values in the conditional expressions presented in the foregoing be further limited as follows in order that the advantages can be enjoyed more surely.

In conditional expression (1), it is more preferred that the upper limit value be 9.0, still more preferably 8.9, still more preferably 8.5, still more preferably 7.0, and the lower limit value be 4.0, still more preferably 4.5.

In conditional expression (3), it is more preferred that the upper limit value be 1.2, and the lower limit value be 0.6.

In conditional expression (4), it is more preferred that the upper limit value be 1.5, and the lower limit value be 0.8.

In conditional expression (5), it is more preferred that the upper limit value be 1.4, and the lower limit value be 0.8.

In conditional expression (6), it is more preferred that the upper limit value be 7.5, still more preferably 6.5, and the lower limit value be 4.5.

In conditional expression (7), it is more preferred that the upper limit value be 22, and the lower limit value be 15.

In conditional expression (8), it is more preferred that the upper limit value be −8%, and the lower limit value be −15%.

In conditional expression (9), it is more preferred that the lower limit value be 65.

In conditional expression (10), it is more preferred that the lower limit value be 70, still more preferably 80.

In conditional expression (11), it is more preferred that the upper limit value be 0.675, and the lower limit value be 0.630.

In conditional expression (13), it is more preferred that the lower limit value be 40°.

In conditional expression (14), it is more preferred that the lower limit value be 4.7.

In the following first to seventh embodiments of the present invention will be described. FIGS. 1A, 2A, 3A, 4A, 5A, 6A, and 7A are cross sectional views of the zoom lenses according to the first to seventh embodiments at the wide angle end in the state that the zoom lenses are focused on an object point at infinity. FIGS. 1B, 2B, 3B, 4B, 5B, 6B, and 7B are cross sectional views of the zoom lenses according to the first to seventh embodiments in an intermediate focal length state in the state that the zoom lenses are focused on an object point at infinity. FIGS. 1C, 2C, 3C, 4C, 5C, 6C, and 7C are cross sectional views of the zoom lenses according to the first to seventh embodiments at the telephoto end in the state that the zoom lenses are focused on an object point at infinity. In FIGS. 1A to 7A, 1B to 7B, and 1C to 7C, a first lens unit is denoted by G1, a second lens unit is denoted by G2, a third lens unit is denoted by G3, a fourth lens unit is denoted by G4, a fifth lens unit is denoted by G5, an aperture stop is denoted by S, and the image plane is denoted by I.

All the numerical data of the embodiments are for the state in which the zoom lens is focused on an object at infinity. In the numerical data, all dimensions are in millimeters and all angles are in degrees. In all the embodiments, focusing is performed by moving the fourth lens unit G4 (as indicated in the cross sectional views by the legend "focus"). Zoom data will be given for the wide angle end (wide angle), for the intermediate zoom state (intermediate), and for the telephoto end (tele). In the first to sixth embodiments, the lens component located closest to the image side in the third lens unit is shifted eccentrically (I.S.) to stabilize image shift caused by vibration of the zoom lens. In cases where the refractive power of the image side lens component is low, the lens component closest to the object side in the third lens unit may be shifted eccentrically.

Figure 1B:
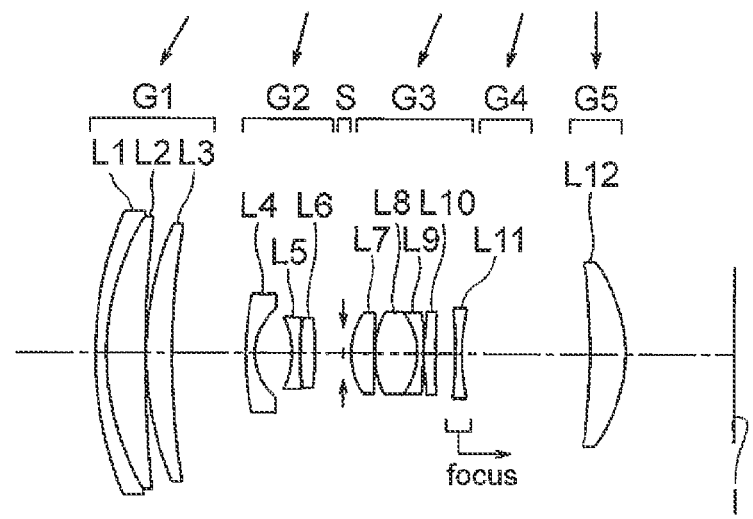
Figure 1C:
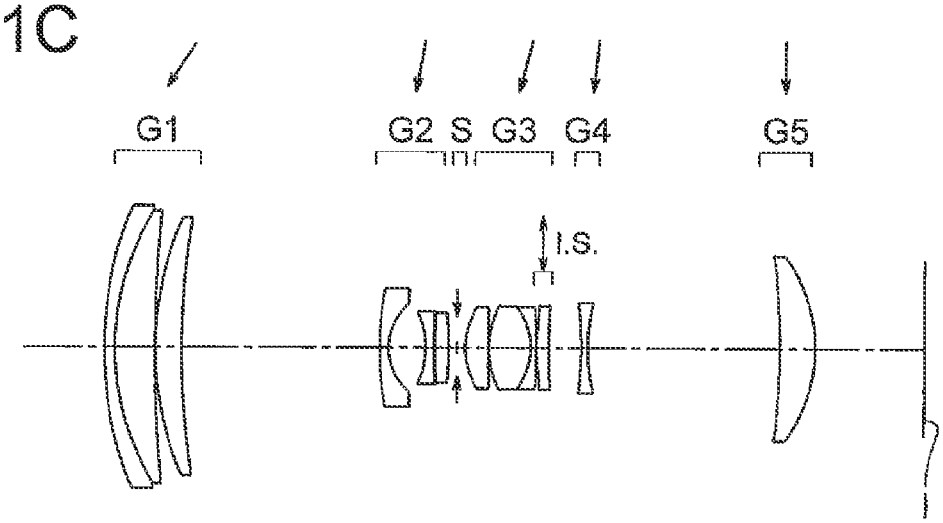

As shown in FIGS. 1A to 1C, the zoom lens according to the first embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

The first lens unit G1 is composed of a negative meniscus lens L1 having a convex surface directed toward the object side, a positive meniscus lens L2 having a convex surface directed toward the object side, and a positive meniscus lens L3 having a convex surface directed toward the object side. The negative meniscus lens L1 and the positive meniscus lens L2 are cemented together. The second lens unit G2 is composed of a negative meniscus lens L4 having a convex surface directed toward the object side, a biconcave negative lens L5, and a biconvex positive lens L6. The third lens unit G3 is composed of a positive meniscus lens L7 having a convex surface directed toward the object side, a biconvex positive lens L8, a negative meniscus lens L9 having a convex surface directed toward the image side, and a biconvex positive lens L10. The biconvex positive lens L8 and the negative meniscus lens L9 are cemented together. The fourth lens unit G4 is composed of a biconcave negative lens L11. The fifth lens unit G5 is composed of a positive meniscus lens L12 having a convex surface directed toward the image side. The lens elements in each lens unit are arranged in the mentioned order from the object side.

During zooming from the wide angle end to the telephoto end, the first lens unit G1 moves toward the object side, the second lens unit G2 moves toward the object side, the third lens unit G3 moves toward the object side, the fourth lens unit G4 moves toward the object side, the fifth lens unit G5 is fixed (stationary), and the aperture stop S moves toward the object side.

There are ten aspheric surfaces, which include both surfaces of the biconcave negative lens L5, both surfaces of the positive meniscus lens L7, both surfaces of the biconvex positive lens L10, both surfaces of the biconcave negative lens L11, and both surfaces of the positive meniscus lens L12.

Figure 2A:
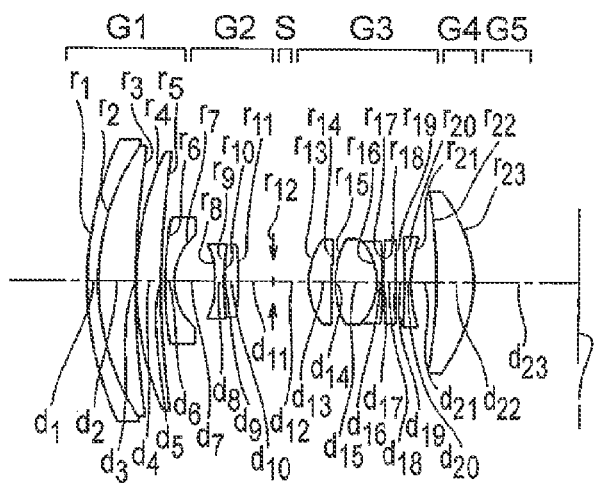
FIGS. 2A, 2B and 2C are cross sectional views taken along the optical axis, showing the configuration of a zoom lens according to a second embodiment of the present invention in the state in which the zoom lens is focused on an object point at infinity, where
Figure 2B:
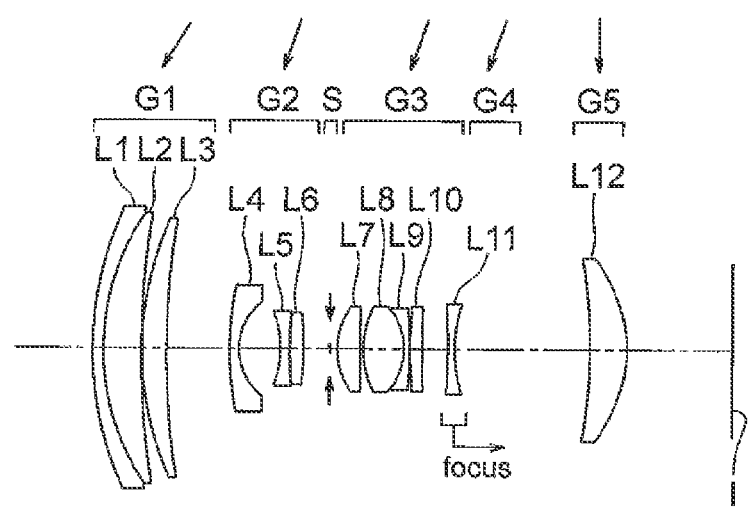
Figure 2C:
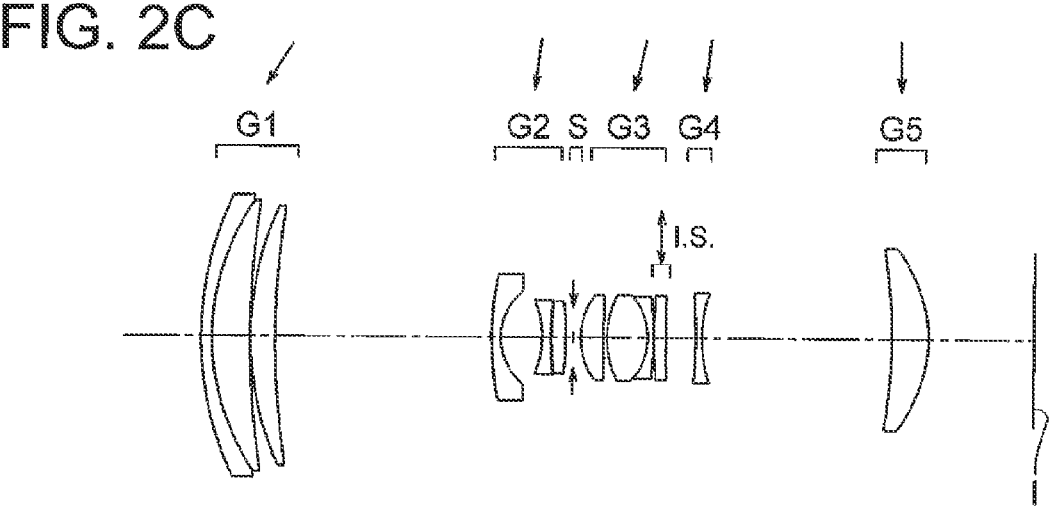

As shown in FIGS. 2A to 2C, the zoom lens according to the second embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

The first lens unit G1 is composed of a negative meniscus lens L1 having a convex surface directed toward the object side, a positive meniscus lens L2 having a convex surface directed toward the object side, and a positive meniscus lens L3 having a convex surface directed toward the object side. The negative meniscus lens L1 and the positive meniscus lens L2 are cemented together. The second lens unit G2 is composed of a negative meniscus lens L4 having a convex surface directed toward the object side, a biconcave negative lens L5, and a biconvex positive lens L6. The third lens unit G3 is composed of a positive meniscus lens L7 having a convex surface directed toward the object side, a biconvex positive lens L8, a negative meniscus lens L9 having a convex surface directed toward the image side, and a biconvex positive lens L10. The biconvex positive lens L8 and the negative meniscus lens L9 are cemented together. The fourth lens unit G4 is composed of a biconcave negative lens L11. The fifth lens unit G5 is composed of a positive meniscus lens L12 having a convex surface directed toward the image side. The lens elements in each lens unit are arranged in the mentioned order from the object side.

During zooming from the wide angle end to the telephoto end, the first lens unit G1 moves toward the object side, the second lens unit G2 moves toward the object side, the third lens unit G3 moves toward the object side, the fourth lens unit G4 moves toward the object side, the fifth lens unit G5 is fixed (stationary), and the aperture stop S moves toward the object side.

There are ten aspheric surfaces, which include both surfaces of the biconcave negative lens L5, both surfaces of the positive meniscus lens L7, both surfaces of the biconvex positive lens L10, both surfaces of the biconcave negative lens L11, and both surfaces of the positive meniscus lens L12.

Figure 3A:
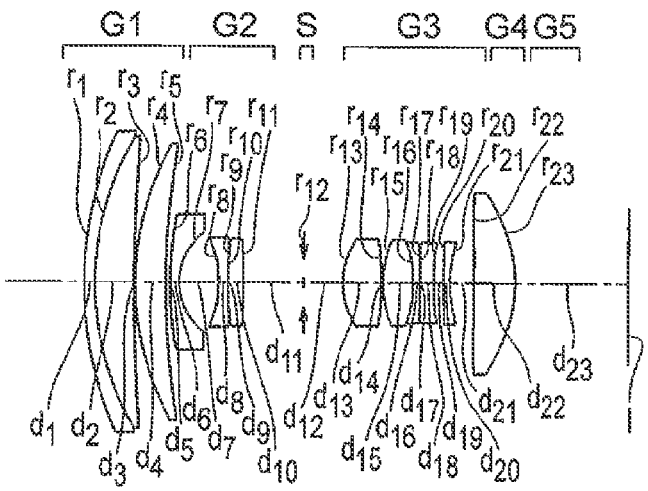
FIGS. 3A, 3B and 3C are cross sectional views taken along the optical axis, showing the configuration of a zoom lens according to a third embodiment of the present invention in the state in which the zoom lens is focused on an object point at infinity, where
Figure 3B:
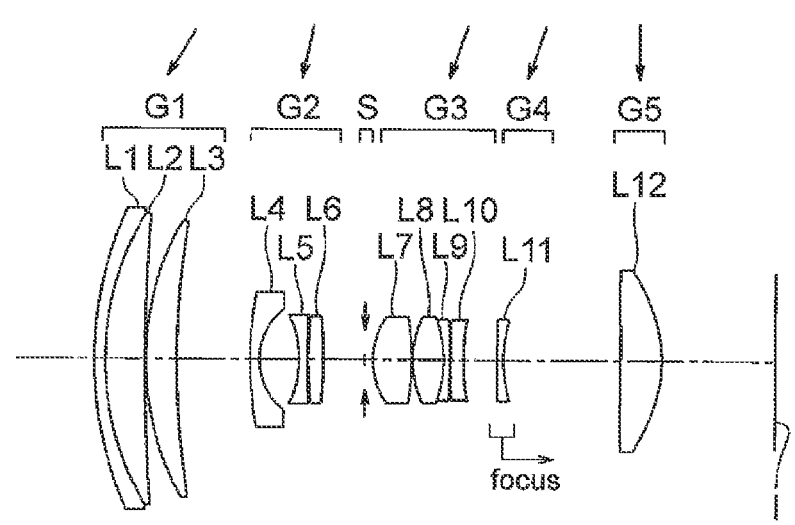
Figure 3C:
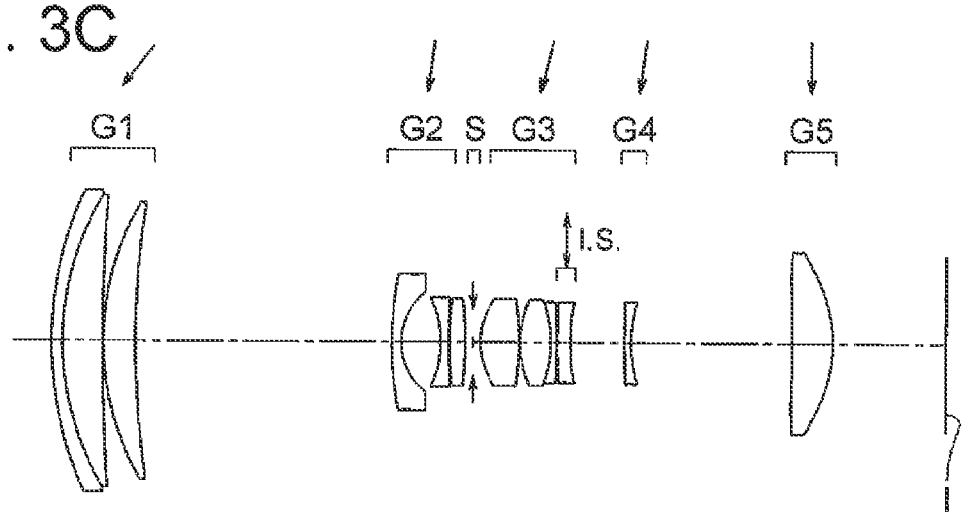

As shown in FIGS. 3A to 3C, the zoom lens according to the third embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

The first lens unit G1 is composed of a negative meniscus lens L1 having a convex surface directed toward the object side, a positive meniscus lens L2 having a convex surface directed toward the object side, and a positive meniscus lens L3 having a convex surface directed toward the object side. The negative meniscus lens L1 and the positive meniscus lens L2 are cemented together. The second lens unit G2 is composed of a negative meniscus lens L4 having a convex surface directed toward the object side, a biconcave negative lens L5, and a biconvex positive lens L6. The third lens unit G3 is composed of a biconvex positive lens L7, a biconvex positive lens L8, a negative meniscus lens L9 having a convex surface directed toward the image side, and a negative meniscus lens L10 having a convex surface directed toward the object side. The biconvex positive lens L8 and the negative meniscus lens L9 are cemented together. The fourth lens unit G4 is composed of a negative meniscus lens L11 having a convex surface directed toward the object side. The fifth lens unit G5 is composed of a positive meniscus lens L12 having a convex surface directed toward the image side. The lens elements in each lens unit are arranged in the mentioned order from the object side.

During zooming from the wide angle end to the telephoto end, the first lens unit G1 moves toward the object side, the second lens unit G2 moves toward the object side, the third lens unit G3 moves toward the object side, the fourth lens unit G4 moves toward the object side, the fifth lens unit G5 is fixed (stationary), and the aperture stop S moves toward the object side.

There are ten aspheric surfaces, which include both surfaces of the biconcave negative lens L5, both surfaces of the biconvex positive lens L7, both surfaces of the negative meniscus lens L10, both surfaces of the negative meniscus lens L11, and both surfaces of the positive meniscus lens L12.

Figure 4A:
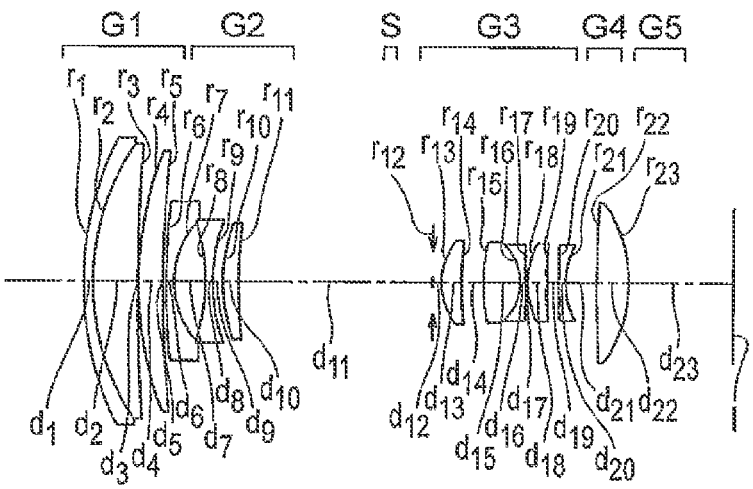
FIGS. 4A, 4B and 4C are cross sectional views taken along the optical axis, showing the configuration of a zoom lens according to a fourth embodiment of the present invention in the state in which the zoom lens is focused on an object point at infinity, where
Figure 4B:
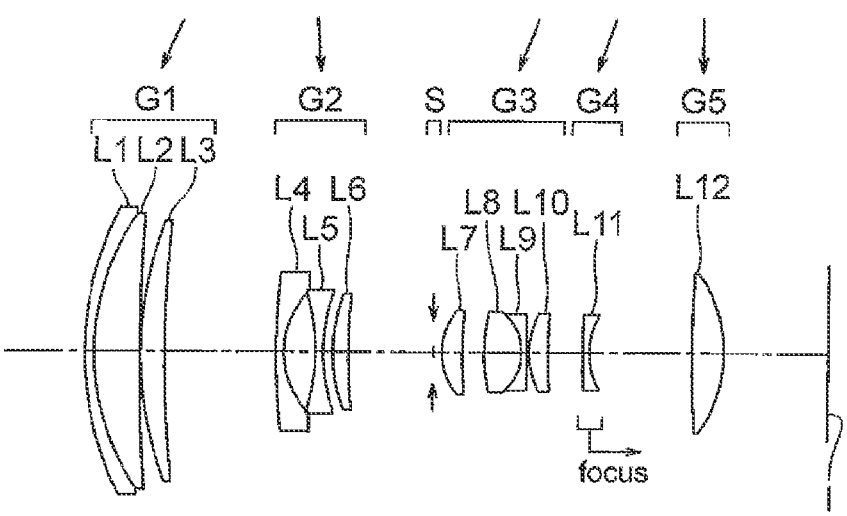
Figure 4C:
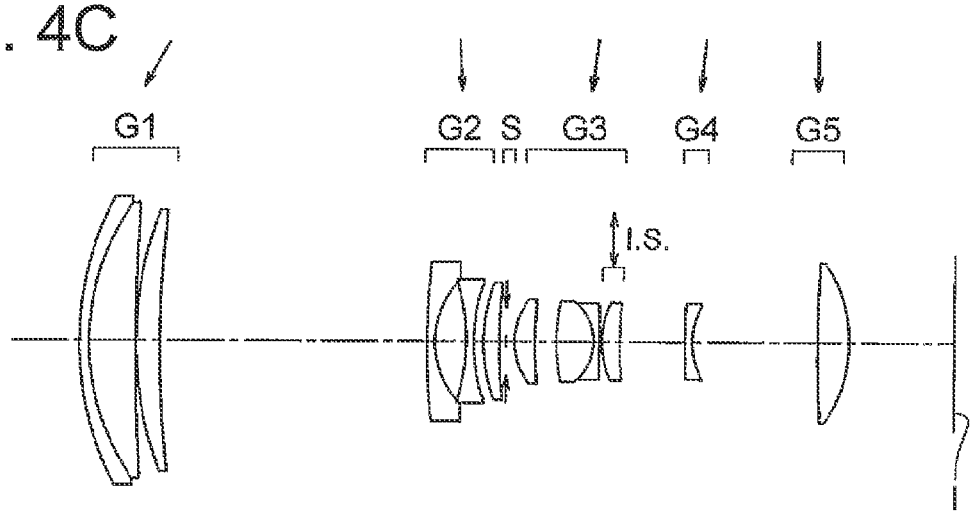

As shown in FIGS. 4A to 4C, the zoom lens according to the fourth embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

The first lens unit G1 is composed of a negative meniscus lens L1 having a convex surface directed toward the object side, a positive meniscus lens L2 having a convex surface directed toward the object side, and a positive meniscus lens L3 having a convex surface directed toward the object side. The negative meniscus lens L1 and the positive meniscus lens L2 are cemented together. The second lens unit G2 is composed of a negative meniscus lens L4 having a convex surface directed toward the object side, a biconcave negative lens L5, and a positive meniscus lens L6 having a convex surface directed toward the object side. The third lens unit G3 is composed of a positive meniscus lens L7 having a convex surface directed toward the object side, a biconvex positive lens L8, a negative meniscus lens L9 having a convex surface directed toward the image side, and a biconvex positive lens L10. The biconvex positive lens L8 and the negative meniscus lens L9 are cemented together. The fourth lens unit G4 is composed of a negative meniscus lens having a convex surface directed toward the object side. The fifth lens unit G5 is composed of a biconvex positive lens L12. The lens elements in each lens unit are arranged in the mentioned order from the object side.

During zooming from the wide angle end to the telephoto end, the first lens unit G1 moves toward the object side, the second lens unit G2 moves toward the image side, the third lens unit G3 moves toward the object side, the fourth lens unit G4 moves toward the object side, the fifth lens unit G5 is fixed (stationary), and the aperture stop S moves toward the object side.

There are ten aspheric surfaces, which include both surfaces of the biconcave negative lens L5, both surfaces of the positive meniscus lens L7, both surfaces of the biconvex positive lens L10, both surfaces of the negative meniscus lens L11, and both surfaces of the biconvex positive lens L12.

Figure 5A:
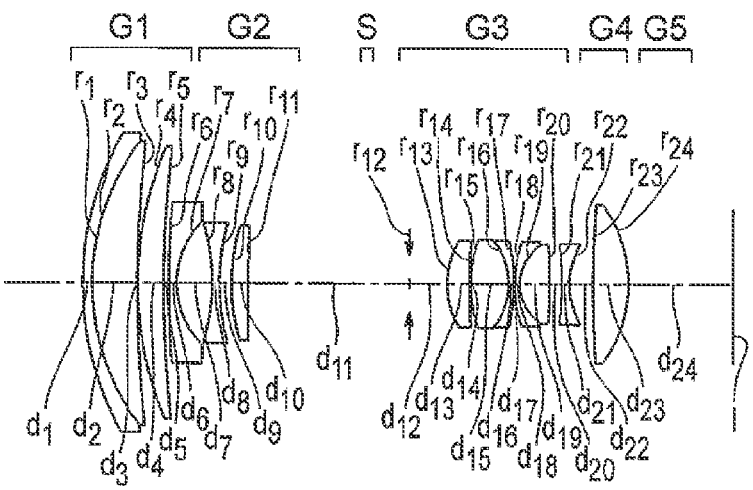
FIGS. 5A, 5B and 5C are cross sectional views taken along the optical axis, showing the configuration of a zoom lens according to a fifth embodiment of the present invention in the state in which the zoom lens is focused on an object point at infinity, where
Figure 5B:
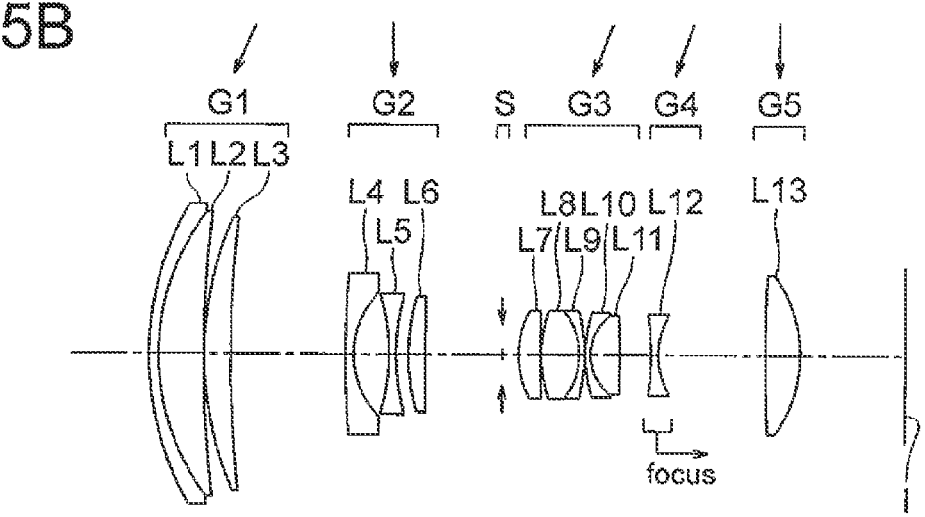
Figure 5C:
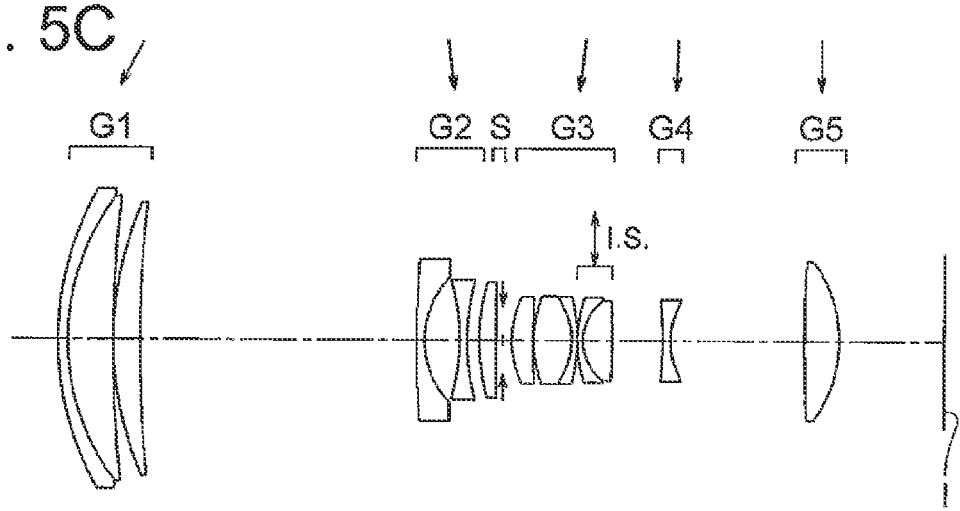

As shown in FIGS. 5A to 5C, the zoom lens according to the fifth embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

The first lens unit G1 is composed of a negative meniscus lens L1 having a convex surface directed toward the object side, a positive meniscus lens L2 having a convex surface directed toward the object side, and a positive meniscus lens L3 having a convex surface directed toward the object side. The negative meniscus lens L1 and the positive meniscus lens L2 are cemented together. The second lens unit G2 is composed of a negative meniscus lens L4 having a convex surface directed toward the object side, a biconcave negative lens L5, and a positive meniscus lens L6. The third lens unit G3 is composed of a positive meniscus lens L7 having a convex surface directed toward the object side, a biconvex positive lens L8, a negative meniscus lens L9 having a convex surface directed toward the image side, a negative meniscus lens L10 having a convex surface directed toward the object side, and a biconvex positive lens L11. The biconvex positive lens L8 and the negative meniscus lens L9 are cemented together, and the negative meniscus lens L10 and the biconvex positive lens L11 are cemented together. The fourth lens unit G4 is composed of a biconcave negative lens L12. The fifth lens unit G5 is composed of a biconvex positive lens L13. The lens elements in each lens unit are arranged in the mentioned order from the object side.

During zooming from the wide angle end to the telephoto end, the first lens unit G1 moves toward the object side, the second lens unit G2 moves toward the image side, the third lens unit G3 moves toward the object side, the fourth lens unit G4 moves toward the object side, the fifth lens unit G5 is fixed (stationary), and the aperture stop S moves toward the object side.

There are seven aspheric surfaces, which include both surfaces of the biconcave negative lens L5, both surfaces of the positive meniscus lens L7, both surfaces of the biconcave negative lens L12, and the object side surface of the biconvex positive lens L13.

Figure 6A:
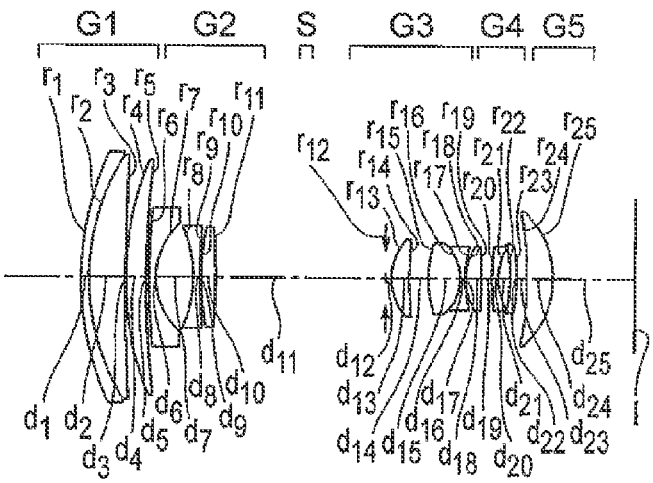
FIGS. 6A, 6B and 6C are cross sectional views taken along the optical axis, showing the configuration of a zoom lens according to a sixth embodiment of the present invention in the state in which the zoom lens is focused on an object point at infinity, where
Figure 6B:
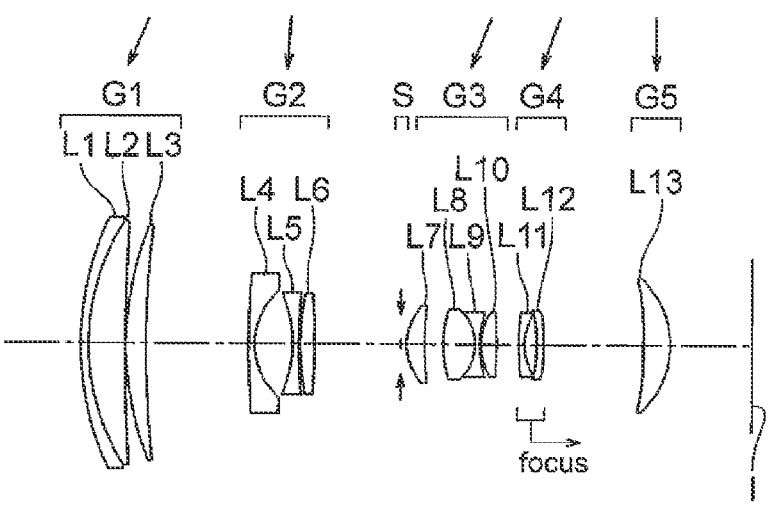
Figure 6C:
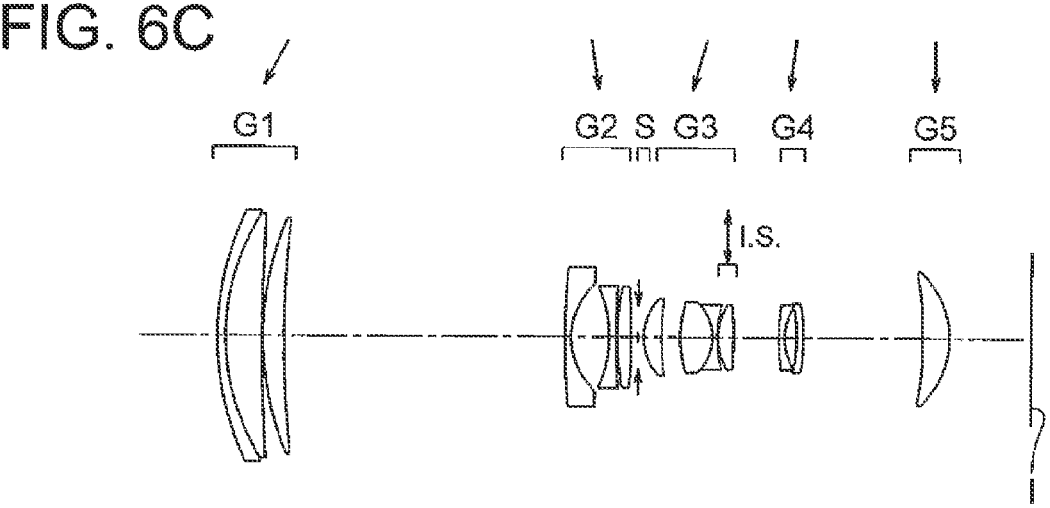

As shown in FIGS. 6A to 6C, the zoom lens according to the sixth embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

The first lens unit G1 is composed of a negative meniscus lens L1 having a convex surface directed toward the object side, a positive meniscus lens L2 having a convex surface directed toward the object side, and a positive meniscus lens L3 having a convex surface directed toward the object side. The negative meniscus lens L1 and the positive meniscus lens L2 are cemented together. The second lens unit G2 is composed of a negative meniscus lens L4 having a convex surface directed toward the object side, a biconcave negative lens L5, and a biconvex positive lens L6. The third lens unit G3 is composed of a positive meniscus lens L7 having a convex surface directed toward the object side, a biconvex positive lens L8, a biconcave negative lens L9, and a biconvex positive lens L10. The biconvex positive lens L8 and the biconcave negative lens L9 are cemented together. The fourth lens unit G4 is composed of a negative meniscus lens L11 having a convex surface directed toward the object side, and a negative meniscus lens L12 having a convex surface directed toward the image side. The fifth lens unit G5 is composed of a positive meniscus lens L13 having a convex surface directed toward the image side. The lens elements in each lens unit are arranged in the mentioned order from the object side.

During zooming from the wide angle end to the telephoto end, the first lens unit G1 moves toward the object side, the second lens unit G2 first moves toward the object side and thereafter moves toward the image side, the third lens unit G3 moves toward the object side, the fourth lens unit G4 moves toward the object side, the fifth lens unit G5 is fixed (stationary), and the aperture stop S moves toward the object side.

There are ten aspheric surfaces, which include both surfaces of the biconcave negative lens L5, both surfaces of the positive meniscus lens L7, both surfaces of the biconvex positive lens L10, both surfaces of the negative meniscus lens L12, and both surfaces of the positive meniscus lens L13.

Figure 7A:
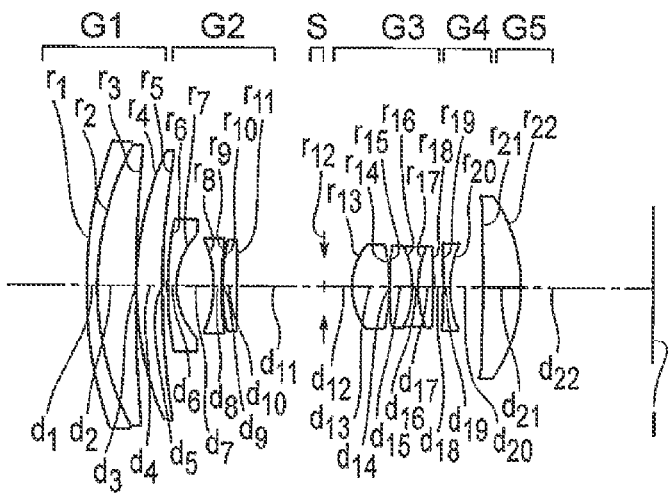
FIGS. 7A, 7B and 7C are cross sectional views taken along the optical axis, showing the configuration of a zoom lens according to a seventh embodiment of the present invention in the state in which the zoom lens is focused on an object point at infinity, where
Figure 7B:
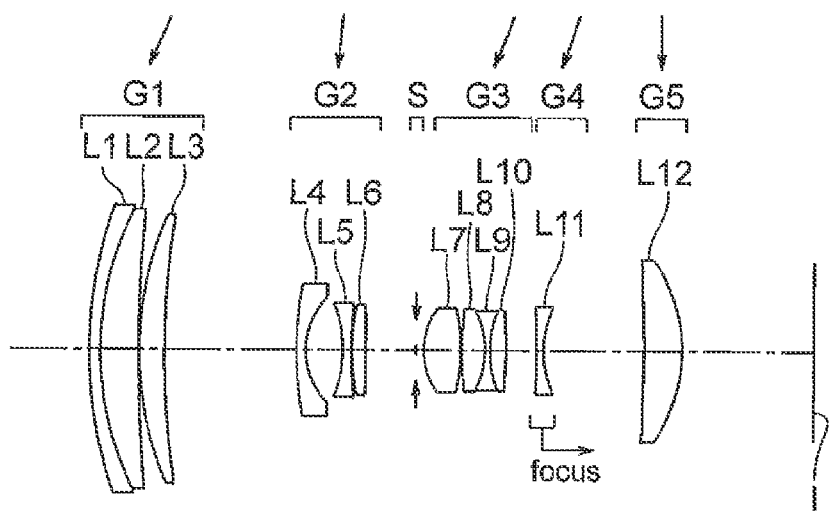
Figure 7C:
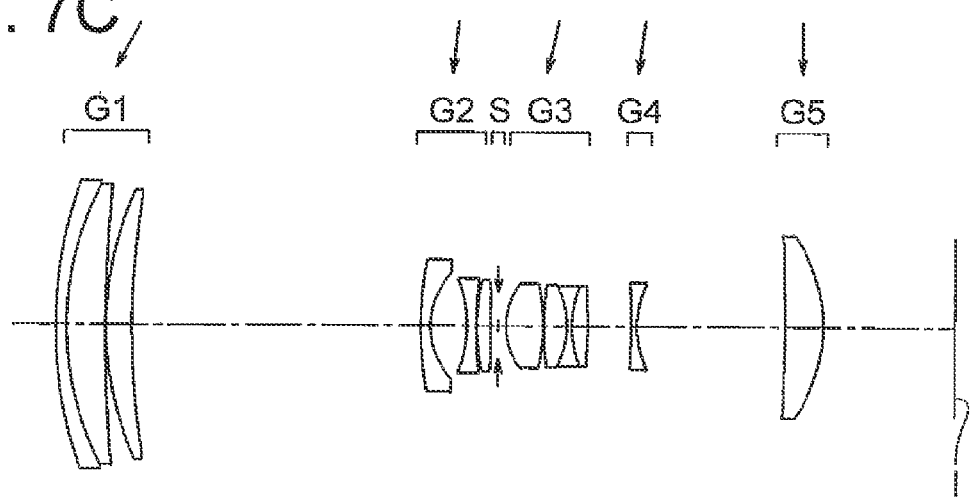
Figure 9A:
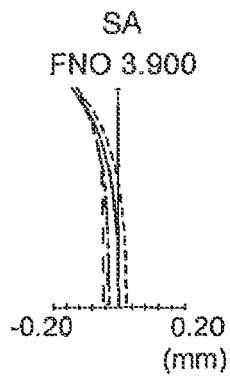
FIGS. 9A, 9B, 9C, 9D, 9E, 9F, 9G, 9H, 9I, 9J, 9K, and 9L are aberration diagrams of the zoom lens according to the second embodiment in the state in which the zoom lens is focused at an object point at infinity.
Figure 9B:
Figure 9C:
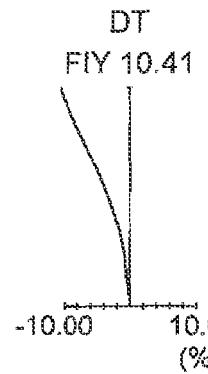
Figure 9D:
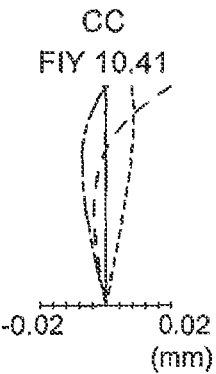
Figure 9E:
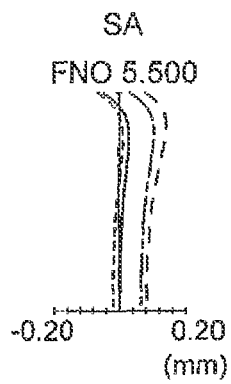
Figure 9F:
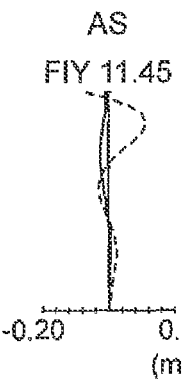
Figure 9G:
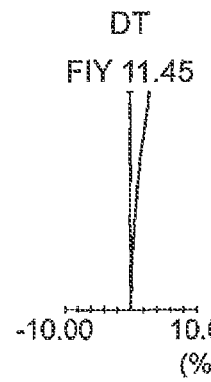
Figure 9H:
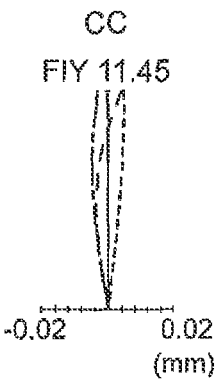
Figure 9I:
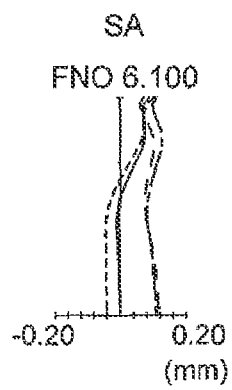
Figure 9J:
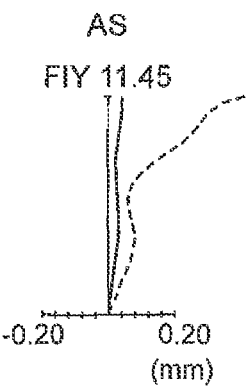
Figure 9K:
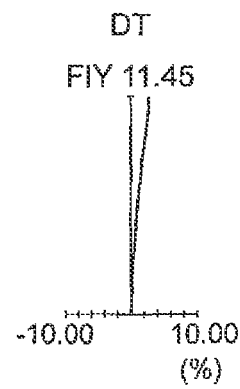
Figure 9L:
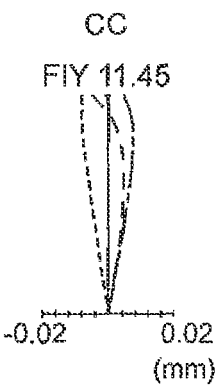

As shown in FIGS. 7A to 7C, the zoom lens according to the seventh embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

The first lens unit G1 is composed of a negative meniscus lens L1 having a convex surface directed toward the object side, a positive meniscus lens L2 having a convex surface directed toward the object side, and a positive meniscus lens L3 having a convex surface directed toward the object side. The negative meniscus lens L1 and the positive meniscus lens L2 are cemented together. The second lens unit G2 is composed of a negative meniscus lens L4 having a convex surface directed toward the object side, a biconcave negative lens L5, and a biconvex positive lens L6. The third lens unit G3 is composed of a biconvex positive lens L7, a biconvex positive lens L8, a biconcave negative lens L9, and a biconvex positive lens L10. The biconvex positive lens L8, the biconcave negative lens L9, and the biconvex positive lens L10 are cemented together. The fourth lens unit G4 is composed of a biconcave negative lens L11. The fifth lens unit G5 is composed of a positive meniscus lens L12 having a convex surface directed toward the image side. The lens elements in each lens unit are arranged in the mentioned order from the object side.

During zooming from the wide angle end to the telephoto end, the first lens unit G1 moves toward the object side, the second lens unit G2 moves toward the object side, the third lens unit G3 moves toward the object side, the fourth lens unit G4 moves toward the object side, the fifth lens unit G5 is fixed (stationary), and the aperture stop S moves toward the object side.

There are nine aspheric surfaces, which include both surfaces of the biconcave negative lens L5, both surfaces of the biconvex positive lens L7, the image side surface of the biconvex positive lens L10, both surfaces of the biconcave negative lens L11, and both surfaces of the positive meniscus lens L12.

Numerical data of each embodiment described above is shown below. Apart from symbols described above, FB denotes a back focus, f1, f2, . . . denotes a focal length of each lens unit, FNO denotes an F number, ω denotes a half image angle, r denotes radius of curvature of each lens surface, d denotes a distance between two lenses, nd denotes a refractive index of each lens for a d-line, and vd denotes an Abbe's number for each lens. The overall length of the lens system which will be described later is a length which is obtained by adding the back focus to a distance from the first lens surface up to the last lens surface. FB (back focus) is a unit which is expressed upon air conversion of a distance from the last lens surface up to a paraxial image plane.

A shape of the aspheric surface is described by the following expression (I) using each aspherical surface coefficient in each embodiment, when Z is let to be a coordinate point on an optical axis, and Y is let to be a coordinate point on a direction orthogonal to the optical axis.

$$Z=(Y^2/r)/[1+\{1-(K+1)(Y/r)^2\}^{1/2}]+A_4Y^4+A_6Y^6+A_8Y^8+A_{10}Y^{10} \quad (I)$$

where, r denotes a paraxial radius of curvature, K denotes a conical coefficient, $A_4$, $A_6$, $A_8$, and $A_{10}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Further, WE denotes wide angle end, ST denotes intermediate focal length state and TE denotes telephoto end.

Example 1

Unit mm

Surface data

| Surface no. | r | d | nd | vd |
|---|---|---|---|---|
| Object plane | ∞ | ∞ | | |
| 1 | 47.695 | 1.400 | 1.84666 | 23.78 |
| 2 | 34.063 | 4.900 | 1.61800 | 63.33 |
| 3 | 165.037 | 0.100 | | |
| 4 | 41.121 | 3.300 | 1.60300 | 65.44 |
| 5 | 102.492 | Variable | | |
| 6 | 36.874 | 1.200 | 1.88300 | 40.76 |
| 7 | 7.454 | 4.653 | | |
| 8* | −12.567 | 1.000 | 1.72903 | 54.04 |
| 9* | 32.827 | 0.100 | | |
| 10 | 41.935 | 1.900 | 1.94595 | 17.98 |
| 11 | −39.659 | Variable | | |
| 12(stop) | ∞ | Variable | | |
| 13* | 9.367 | 2.936 | 1.59201 | 67.02 |
| 14* | 71.488 | 0.100 | | |
| 15 | 12.079 | 5.248 | 1.49700 | 81.54 |
| 16 | −8.796 | 0.700 | 1.90366 | 31.32 |
| 17 | 177.565 | 0.100 | | |
| 18* | 24.703 | 1.600 | 1.69350 | 53.18 |
| 19* | −66.287 | Variable | | |
| 20* | −34.654 | 0.800 | 1.53071 | 55.69 |
| 21* | 33.314 | Variable | | |
| 22* | −67.050 | 4.460 | 1.53071 | 55.69 |
| 23* | −17.496 | 13.847 | | |
| Image plane (Light receiving surface) | ∞ | | | | stop surface 12

Aspherical surface data

8th surface

K = 0.0000
A4 = −8.9370e−004, A6 = 4.4139e−005, A8 = −1.6958e−006,
A10 = 3.3206e−008, A12 = 0.0000e+000, A14 = 0.0000e+000,
A16 = 0.0000e+000, A18 = 0.0000e+000, A20 = 0.0000e+000

9th surface

K = 0.0000
A4 = −8.6521e−004, A6 = 4.7230e−005, A8 = −1.8790e−006,
A10 = 3.9393e−008, A12 = 0.0000e+000, A14 = 0.0000e+000,
A16 = 0.0000e+000, A18 = 0.0000e+000,
A20 = 0.0000e+000

13th surface

K = 0.0000
A4 = −2.2000e−005, A6 = −8.4302e−007, A8 = −1.4000e−008,
A10 = 3.6867e−010, A12 = 0.0000e+000, A14 = 0.0000e+000,
A16 = 0.0000e+000, A18 = 0.0000e+000, A20 = 0.0000e+000

14th surface

K = 0.0000
A4 = −6.1483e−005, A6 = −2.8928e−006, A8 = −4.6937e−008,
A10 = 1.1518e−009, A12 = 0.0000e+000, A14 = 0.0000e+000,
A16 = 0.0000e+000, A18 = 0.0000e+000, A20 = 0.0000e+000

18th surface

K = 0.0000
A4 = −7.1544e−005, A6 = −5.0995e−006, A8 = −7.6392e−008,
A10 = −2.8439e−009, A12 = 0.0000e+000, A14 = 0.0000e+000,
A16 = 0.0000e+000, A18 = 0.0000e+000, A20 = 0.0000e+000

19th surface

K = 0.0000
A4 = 4.6268e−004, A6 = 1.9190e−006, A8 = −8.3070e−008,
A10 = −2.6743e−011, A12 = 0.0000e+000, A14 = 0.0000e+000,
A16 = 0.0000e+000, A18 = 0.0000e+000, A20 = 0.0000e+000

20th surface

K = 0.0000
A4 = 4.1877e−004, A6 = −7.3611e−006, A8 = −3.2351e−007,
A10 = 7.1729e−009, A12 = 0.0000e+000, A14 = 0.0000e+000,
A16 = 0.0000e+000, A18 = 0.0000e+000, A20 = 0.0000e+000

21th surface

K = 0.0000
A4 = 4.6187e−004, A6 = −9.6978e−006, A8 = −2.4869e−007,
A10 = 6.4250e−009, A12 = 0.0000e+000, A14 = 0.0000e+000,
A16 = 0.0000e+000, A18 = 0.0000e+000, A20 = 0.0000e+000

-continued

Unit mm

22th surface

K = 0.0000
A4 = 2.1271e−005, A6 = −1.1901e−007, A8 = 4.1202e−009,
A10 = −2.9920e−011, A12 = 0.0000e+000, A14 = 0.0000e+000,
A16 = 0.0000e+000, A18 = 0.0000e+000, A20 = 0.0000e+000
23th surface K = 0.0000
A4 = 4.9454e−005, A6 = −3.7779e−007, A8 = 6.8170e−009,
A10 = −3.5156e−011, A12 = 0.0000e+000, A14 = 0.0000e+000,
A16 = 0.0000e+000, A18 = 0.0000e+000, A20 = 0.0000e+000

Zoom data

|  | WE | ST | TE |
|---|---|---|---|
| Focal length | 12.249 | 25.475 | 58.644 |
| Fno. | 3.900 | 5.500 | 6.100 |
| Angle of field 2ω | 85.0 | 46.1 | 21.0 |
| Image height | 10.08 | 11.15 | 11.15 |
| FB | 13.847 | 13.847 | 13.847 |
| Lens total length | 62.083 | 80.696 | 103.582 |
| d5 | 0.500 | 9.296 | 25.013 |
| d11 | 4.365 | 3.509 | 1.000 |
| d12 | 3.766 | 1.000 | 1.000 |
| d19 | 1.200 | 2.437 | 4.047 |
| d21 | 3.906 | 16.110 | 24.177 |

Unit focal length f1 = 61.7989  f2 = −7.51205  f3 = 11.3123  f4 = −31.875  f5 = 43.2579

| RRO/RCI | −0.139 |
|---|---|
| ft/fw | 4.788 |
| RCI | −177.565 |
| RRO | 24.7029 |

Example 2

Unit mm

Surface data

| Surface no. | r | d | nd | vd |
|---|---|---|---|---|
| Object plane | ∞ | ∞ | | |
| 1 | 44.384 | 1.400 | 1.84666 | 23.78 |
| 2 | 32.017 | 4.900 | 1.61800 | 63.33 |
| 3 | 113.477 | 0.100 | | |
| 4 | 41.622 | 3.200 | 1.61800 | 63.33 |
| 5 | 107.616 | Variable | | |
| 6 | 42.933 | 1.200 | 1.88300 | 40.76 |
| 7 | 8.036 | 5.427 | | |
| 8* | −15.590 | 1.100 | 1.72903 | 54.04 |
| 9* | 24.516 | 0.100 | | |
| 10 | 42.804 | 1.800 | 1.94595 | 17.98 |
| 11 | −42.208 | Variable | | |
| 12(stop) | ∞ | Variable | | |
| 13* | 9.509 | 3.000 | 1.59201 | 67.02 |
| 14* | 115.899 | 0.432 | | |
| 15 | 12.583 | 5.332 | 1.49700 | 81.54 |
| 16 | −8.327 | 0.700 | 1.90366 | 31.32 |
| 17 | −70.180 | 0.100 | | |
| 18* | 31.798 | 1.600 | 1.69350 | 53.18 |
| 19* | −79.446 | Variable | | |
| 20* | −38.464 | 0.800 | 1.53071 | 55.69 |
| 21* | 23.597 | Variable | | |
| 22* | −60.763 | 4.832 | 1.53071 | 55.69 |
| 23* | −17.021 | 13.898 | | |
| Image plane (Light receiving surface) stop surface 12 | ∞ | | | |

Aspherical surface data

8th surface

K = 0.0000
A4 = −9.4455e−004, A6 = 4.2790e−005, A8 = −1.4902e−006,
A10 = 2.5533e−008, A12 = 0.0000e+000, A14 = 0.0000e+000,
A16 = 0.0000e+000, A18 = 0.0000e+000, A20 = 0.0000e+000
9th surface K = 0.0000
A4 = −9.3512e−004, A6 = 4.6723e−005, A8 = −1.7357e−006,
A10 = 3.2480e−008, A12 = 0.0000e+000, A14 = 0.0000e+000,
A16 = 0.0000e+000, A18 = 0.0000e+000, A20 = 0.0000e+000
13th surface K = 0.0000
A4 = 6.5524e−006, A6 = −4.2717e−007, A8 = −2.2891e−008,
A10 = 3.4152e−010, A12 = 0.0000e+000, A14 = 0.0000e+000,
A16 = 0.0000e+000, A18 = 0.0000e+000, A20 = 0.0000e+000
14th surface K = 0.0000
A4 = 3.5768e−007, A6 = −2.1268e−006, A8 = −4.9995e−008,
A10 = 8.9886e−010, A12 = 0.0000e+000, A14 = 0.0000e+000,
A16 = 0.0000e+000, A18 = 0.0000e+000, A20 = 0.0000e+000
18th surface K = 0.0000
A4 = −3.2477e−005, A6 = −6.2036e−006, A8 = −1.4880e−007,
A10 = −3.8629e−010, A12 = 0.0000e+000, A14 = 0.0000e+000,
A16 = 0.0000e+000, A18 = 0.0000e+000, A20 = 0.0000e+000
19th surface K = 0.0000
A4 = 3.9580e−004, A6 = −8.1836e−008, A8 = −1.7631e−007,
A10 = 2.3699e−009, A12 = 0.0000e+000, A14 = 0.0000e+000,
A16 = 0.0000e+000, A18 = 0.0000e+000, A20 = 0.0000e+000
20th surface K = 0.0000
A4 = 4.3981e−004, A6 = −5.8985e−006, A8 = −3.2607e−007,
A10 = 7.6928e−009, A12 = 0.0000e+000, A14 = 0.0000e+000,
A16 = 0.0000e+000, A18 = 0.0000e+000, A20 = 0.0000e+000
21th surface K = 0.0000
A4 = 4.9199e−004, A6 = −7.8843e−006, A8 = −2.6016e−007,
A10 = 6.5765e−009, A12 = 0.0000e+000, A14 = 0.0000e+000,
A16 = 0.0000e+000, A18 = 0.0000e+000, A20 = 0.0000e+000
22th surface K = 0.0000
A4 = −2.7596e−006, A6 = 2.8738e−008, A8 = 3.1392e−009,
A10 = −2.1852e−011, A12 = 0.0000e+000, A14 = 0.0000e+000,
A16 = 0.0000e+000, A18 = 0.0000e+000, A20 = 0.0000e+000
23th surface K = 0.0000
A4 = 3.2459e−005, A6 = −3.0040e−007, A8 = 5.9187e−009,
A10 = −2.6451e−011, A12 = 0.0000e+000, A14 = 0.0000e+000,
A16 = 0.0000e+000, A18 = 0.0000e+000, A20 = 0.0000e+000

Zoom data

|  | WE | ST | TE |
|---|---|---|---|
| Focal length | 12.250 | 28.009 | 68.590 |
| Fno. | 3.900 | 5.500 | 6.100 |
| Angle of field 2ω | 85.2 | 42.3 | 18.0 |
| Image height | 10.11 | 11.15 | 11.15 |

-continued

| Unit mm | | | |
|---|---|---|---|
| FB | 13.898 | 13.898 | 13.898 |
| Lens total length | 64.083 | 83.392 | 108.571 |
| d5 | 0.500 | 8.277 | 28.177 |
| d11 | 4.542 | 3.373 | 1.000 |
| d12 | 4.582 | 1.000 | 1.000 |
| d19 | 1.207 | 3.342 | 3.917 |
| d21 | 3.331 | 17.478 | 24.558 |

| Unit focal length | | | | |
|---|---|---|---|---|
| f1 = 63.5258 | f2 = −7.7611 | f3 = 11.5221 | f4 = −27.4349 | f5 = 42.9079 |

| | |
|---|---|
| RRO/RCI | −0.453 |
| ft/fw | 5.599 |
| RCI | −70.1799 |
| RRO | 31.7977 |

Example 3

| Unit mm | | | | |
|---|---|---|---|---|
| Surface data | | | | |
| Surface no. | r | d | nd | vd |
| Object plane | ∞ | ∞ | | |
| 1 | 48.045 | 1.400 | 2.00069 | 25.46 |
| 2 | 37.338 | 5.100 | 1.49700 | 81.61 |
| 3 | 266.383 | 0.100 | | |
| 4 | 36.947 | 4.000 | 1.49700 | 81.61 |
| 5 | 113.697 | Variable | | |
| 6 | 46.864 | 1.200 | 1.88300 | 40.76 |
| 7 | 8.223 | 5.087 | | |
| 8* | −17.424 | 1.100 | 1.72903 | 54.04 |
| 9* | 40.986 | 0.100 | | |
| 10 | 45.911 | 2.000 | 1.94595 | 17.98 |
| 11 | −57.159 | Variable | | |
| 12(stop) | ∞ | Variable | | |
| 13* | 9.566 | 4.957 | 1.49700 | 81.54 |
| 14* | −44.397 | 0.173 | | |
| 15 | 13.646 | 3.918 | 1.49700 | 81.61 |
| 16 | −15.752 | 0.800 | 1.90366 | 31.32 |
| 17 | −87.539 | 0.100 | | |
| 18* | 113.088 | 1.700 | 1.76802 | 49.24 |
| 19* | 73.379 | Variable | | |
| 20* | 88.795 | 0.800 | 1.83441 | 37.28 |
| 21* | 15.658 | Variable | | |
| 22* | −256.424 | 5.276 | 1.49710 | 81.56 |
| 23* | −18.331 | 14.737 | | |
| Image plane | ∞ | | | |
| (Light receiving surface) | | | | |
| stop surface 12 | | | | |

Aspherical surface data

8th surface

K = 0.0000
A4 = −5.6373e−004, A6 = 1.7822e−005, A8 = −4.7379e−007,
A10 = 6.0826e−009, A12 = 0.0000e+000, A14 = 0.0000e+000,
A16 = 0.0000e+000, A18 = 0.0000e+000, A20 = 0.0000e+000

9th surface

K = 0.0000
A4 = −5.5856e−004, A6 = 1.9459e−005, A8 = −5.2477e−007,
A10 = 7.0911e−009, A12 = 0.0000e+000, A14 = 0.0000e+000,
A16 = 0.0000e+000, A18 = 0.0000e+000, A20 = 0.0000e+000

13th surface

K = 0.0000
A4 = −8.1000e−005, A6 = 5.2425e−007, A8 = −3.7122e−008,
A10 = 4.5000e−010, A12 = −1.5970e−012, A14 = 0.0000e+000,
A16 = 0.0000e+000, A18 = 0.0000e+000, A20 = 0.0000e+000

-continued

Unit mm

14th surface

K = 0.0000
A4 = −9.4290e−005, A6 = 2.3854e−006, A8 = −6.4913e−008,
A10 = 4.7975e−010, A12 = 2.4700e−012, A14 = 0.0000e+000,
A16 = 0.0000e+000, A18 = 0.0000e+000, A20 = 0.0000e+000

18th surface

K = 0.0000
A4 = −2.1094e−004, A6 = 9.5687e−006, A8 = −2.3448e−007,
A10 = 0.0000e+000, A12 = 0.0000e+000, A14 = 0.0000e+000,
A16 = 0.0000e+000, A18 = 0.0000e+000, A20 = 0.0000e+000

19th surface

K = 0.0000
A4 = 1.6006e−004, A6 = 1.1727e−005, A8 = −1.4875e−007,
A10 = 0.0000e+000, A12 = 0.0000e+000, A14 = 0.0000e+000,
A16 = 0.0000e+000, A18 = 0.0000e+000, A20 = 0.0000e+000

20th surface

K = 0.0000
A4 = −8.8376e−005, A6 = −2.7360e−006, A8 = −2.1134e−008,
A10 = 2.5000e−009, A12 = 0.0000e+000, A14 = 0.0000e+000,
A16 = 0.0000e+000, A18 = 0.0000e+000, A20 = 0.0000e+000

21th surface

K = 0.0000
A4 = −5.5452e−005, A6 = −4.5732e−006, A8 = 2.0582e−008,
A10 = 1.2856e−009, A12 = 0.0000e+000, A14 = 0.0000e+000,
A16 = 0.0000e+000, A18 = 0.0000e+000, A20 = 0.0000e+000

22th surface

K = 0.0000
A4 = −2.3579e−005, A6 = 4.9528e−007, A8 = −1.6664e−009,
A10 = 4.7360e−013, A12 = 0.0000e+000, A14 = 0.0000e+000,
A16 = 0.0000e+000, A18 = 0.0000e+000, A20 = 0.0000e+000

23th surface

K = 0.0000
A4 = −9.3071e−006, A6 = 2.3579e−007, A8 = 1.2742e−009,
A10 = −7.4127e−012, A12 = 0.0000e+000, A14 = 0.0000e+000,
A16 = 0.0000e+000, A18 = 0.0000e+000, A20 = 0.0000e+000

| Zoom data | | | |
|---|---|---|---|
| | WE | ST | TE |
| Focal length | 12.247 | 28.002 | 84.602 |
| Fno. | 3.971 | 5.535 | 6.138 |
| Angle of field 2ω | 84.6 | 42.3 | 14.6 |
| Image height | 10.10 | 11.15 | 11.15 |
| FB | 14.737 | 14.737 | 14.737 |
| Lens total length | 70.071 | 87.700 | 115.094 |
| d5 | 0.500 | 9.477 | 33.036 |
| d11 | 7.643 | 5.360 | 1.000 |
| d12 | 5.000 | 1.000 | 1.000 |
| d19 | 1.245 | 4.254 | 6.857 |
| d21 | 3.136 | 15.063 | 20.653 |

| Unit focal length | | | |
|---|---|---|---|
| f1 = 68.1605 | f2 = −8.73011 | f3 = 12.4121 | f4 = −22.8961 |
| f5 = 39.4259 | | | |

| | |
|---|---|
| RRO/RCI | −1.292 |
| ft/fw | 6.908 |
| RCI | −87.5392 |
| RRO | 113.088 |

Example 4

Unit mm

Surface data

| Surface no. | r | d | nd | vd |
|---|---|---|---|---|
| Object plane | ∞ | ∞ | | |
| 1 | 48.252 | 1.400 | 2.00069 | 25.46 |
| 2 | 37.307 | 6.700 | 1.49700 | 81.61 |
| 3 | 296.695 | 0.100 | | |
| 4 | 56.167 | 3.472 | 1.60300 | 65.44 |
| 5 | 180.333 | Variable | | |
| 6 | 109.460 | 1.200 | 1.88300 | 40.76 |
| 7 | 13.500 | 4.634 | | |
| 8* | −27.368 | 1.100 | 1.72903 | 54.04 |
| 9* | 29.555 | 1.440 | | |
| 10 | 25.732 | 2.300 | 1.94595 | 17.98 |
| 11 | 83.935 | Variable | | |
| 12(stop) | ∞ | 1.300 | | |
| 13* | 10.255 | 2.941 | 1.49700 | 81.54 |
| 14* | 60.947 | 3.152 | | |
| 15 | 27.962 | 5.449 | 1.63854 | 55.38 |
| 16 | −7.872 | 0.800 | 1.88300 | 40.76 |
| 17 | −592.740 | 0.300 | | |
| 18* | 13.368 | 2.800 | 1.51633 | 64.14 |
| 19* | −230.393 | Variable | | |
| 20* | 166.407 | 1.000 | 1.80139 | 45.45 |
| 21* | 11.821 | Variable | | |
| 22* | 179.705 | 4.603 | 1.49710 | 81.56 |
| 23* | −22.868 | 15.653 | | |
| Image plane (Light receiving surface) | ∞ | | | | stop surface 12

Aspherical surface data

8th surface

K = 0.0000
A4 = 1.7280e−007, A6 = 2.6974e−007, A8 = 1.8914e−010,
A10 = −9.8172e−012, A12 = 0.0000e+000, A14 = 0.0000e+000,
A16 = 0.0000e+000, A18 = 0.0000e+000, A20 = 0.0000e+000

9th surface

K = 0.0000
A4 = 9.5090e−006, A6 = 2.1983e−007, A8 = 2.2921e−009,
A10 = −2.4096e−011, A12 = 0.0000e+000, A14 = 0.0000e+000,
A16 = 0.0000e+000, A18 = 0.0000e+000, A20 = 0.0000e+000

13th surface

K = 0.0000
A4 = −1.5800e−005, A6 = 4.5000e−007, A8 = −2.3463e−008,
A10 = 1.7222e−010, A12 = −5.4219e−012, A14 = 0.0000e+000,
A16 = 0.0000e+000, A18 = 0.0000e+000, A20 = 0.0000e+000

14th surface

K = 0.0000
A4 = −1.8634e−006, A6 = 1.8315e−007, A8 = 2.8586e−008,
A10 = −7.7086e−011, A12 = −1.9235e−012, A14 = 0.0000e+000,
A16 = 0.0000e+000, A18 = 0.0000e+000, A20 = 0.0000e+000

18th surface

K = 0.0000
A4 = 4.1360e−005, A6 = 2.3010e−006, A8 = −6.8235e−008,
A10 = 0.0000e+000, A12 = 0.0000e+000, A14 = 0.0000e+000,
A16 = 0.0000e+000, A18 = 0.0000e+000, A20 = 0.0000e+000

19th surface

K = 0.0000
A4 = 2.4772e−004, A6 = 3.6931e−006, A8 = −8.0091e−008,
A10 = 0.0000e+000, A12 = 0.0000e+000, A14 = 0.0000e+000,
A16 = 0.0000e+000, A18 = 0.0000e+000, A20 = 0.0000e+000

Unit mm

20th surface

K = 0.0000
A4 = 1.4773e−005, A6 = −4.5608e−007, A8 = −1.9724e−008,
A10 = 5.8799e−010, A12 = 0.0000e+000, A14 = 0.0000e+000,
A16 = 0.0000e+000, A18 = 0.0000e+000, A20 = 0.0000e+000

21st surface

K = 0.0000
A4 = 3.0185e−005, A6 = −3.6710e−007, A8 = −5.2205e−008,
A10 = 1.1570e−009, A12 = 0.0000e+000, A14 = 0.0000e+000,
A16 = 0.0000e+000, A18 = 0.0000e+000, A20 = 0.0000e+000

22th surface

K = 0.0000
A4 = −2.2915e−005, A6 = 1.5349e−007, A8 = 2.2202e−009,
A10 = −1.7048e−011, A12 = 0.0000e+000, A14 = 0.0000e+000,
A16 = 0.0000e+000, A18 = 0.0000e+000, A20 = 0.0000e+000

23th surface

K = 0.0000
A4 = −2.0317e−005, A6 = −1.9223e−007, A8 = 5.5225e−009,
A10 = −2.6769e−011, A12 = 0.0000e+000, A14 = 0.0000e+000,
A16 = 0.0000e+000, A18 = 0.0000e+000, A20 = 0.0000e+000

Zoom data

| | WE | ST | TE |
|---|---|---|---|
| Focal length | 12.247 | 34.009 | 117.568 |
| Fno. | 4.000 | 5.500 | 6.200 |
| Angle of field 2ω | 84.6 | 35.3 | 10.5 |
| Image height | 10.04 | 11.15 | 11.15 |
| FB | 15.653 | 15.653 | 15.653 |
| Lens total length | 95.572 | 109.416 | 128.582 |
| d5 | 0.500 | 16.510 | 39.263 |
| d11 | 28.330 | 12.398 | 1.000 |
| d19 | 1.806 | 5.015 | 9.460 |
| d21 | 4.592 | 15.148 | 18.516 |

Unit focal length f1 = 76.9854  f2 = −11.6484  f3 = 15.6647  f4 = −15.925  f5 = 41.1207

| RRO/RCI | −0.023 |
|---|---|
| ft/fw | 9.600 |
| RCI | −592.74 |
| RRO | 13.3684 |

Example 5

Unit mm

Surface data

| Surface no. | r | d | nd | vd |
|---|---|---|---|---|
| Object plane | ∞ | ∞ | | |
| 1 | 46.276 | 1.400 | 2.00330 | 28.27 |
| 2 | 35.701 | 6.700 | 1.49700 | 81.61 |
| 3 | 179.682 | 0.100 | | |
| 4 | 52.522 | 3.865 | 1.59282 | 68.63 |
| 5 | 179.421 | Variable | | |
| 6 | 155.698 | 1.200 | 1.88300 | 40.76 |
| 7 | 13.500 | 5.279 | | |
| 8* | −29.049 | 1.100 | 1.76802 | 49.24 |
| 9* | 36.852 | 1.835 | | |
| 10 | 32.273 | 2.500 | 1.92286 | 18.90 |
| 11 | 766.965 | Variable | | |
| 12(stop) | ∞ | Variable | | |
| 13* | 13.941 | 3.267 | 1.49700 | 81.54 |
| 14* | 215.658 | 0.100 | | |
| 15 | 19.642 | 5.647 | 1.61293 | 37.00 |

-continued

Unit mm

| | | | | |
|---|---|---|---|---|
| 16 | −10.819 | 0.800 | 1.91082 | 35.25 |
| 17 | −27.827 | 0.100 | | |
| 18 | 20.131 | 0.800 | 1.90366 | 31.32 |
| 19 | 7.429 | 4.323 | 1.49700 | 81.54 |
| 20 | −131.704 | Variable | | |
| 21* | −68.343 | 1.100 | 1.53071 | 55.69 |
| 22* | 10.730 | Variable | | |
| 23* | 175.465 | 5.184 | 1.49710 | 81.56 |
| 24 | −20.641 | 15.363 | | |
| Image plane (Light receiving surface) | ∞ | | | | stop surface 12

Aspherical surface data

8th surface

K = 0.0000
A4 = 3.2975e−005, A6 = −2.4885e−007, A8 = −2.8015e−010,
A10 = 9.9466e−012, A12 = 0.0000e+000, A14 = 0.0000e+000,
A16 = 0.0000e+000, A18 = 0.0000e+000, A20 = 0.0000e+000

9th surface

K = 0.0000
A4 = 3.1839e−005, A6 = −2.4455e−007, A8 = −2.1269e−010,
A10 = 1.2027e−011, A12 = 0.0000e+000, A14 = 0.0000e+000,
A16 = 0.0000e+000, A18 = 0.0000e+000, A20 = 0.0000e+000

13th surface

K = 0.0000
A4 = −1.1110e−005, A6 = 1.5011e−007, A8 = 3.3020e−009,
A10 = 1.2366e−010, A12 = −1.3832e−012, A14 = 0.0000e+000,
A16 = 0.0000e+000, A18 = 0.0000e+000, A20 = 0.0000e+000

14th surface

K = 0.0000
A4 = 3.1731e−005, A6 = 5.7923e−010, A8 = −3.8555e−009,
A10 = 2.7644e−010, A12 = −3.1016e−012, A14 = 0.0000e+000,
A16 = 0.0000e+000, A18 = 0.0000e+000, A20 = 0.0000e+000

21th surface

K = 0.0000
A4 = −3.9750e−005, A6 = −2.2106e−006, A8 = 4.9317e−008,
A10 = −6.7258e−010, A12 = 0.0000e+000, A14 = 0.0000e+000,
A16 = 0.0000e+000, A18 = 0.0000e+000, A20 = 0.0000e+000

22th surface

K = 0.0000
A4 = −6.6102e−005, A6 = −2.4040e−006, A8 = 4.7775e−009,
A10 = −4.3615e−011, A12 = 0.0000e+000, A14 = 0.0000e+000,
A16 = 0.0000e+000, A18 = 0.0000e+000, A20 = 0.0000e+000

23th surface

K = 0.0000
A4 = −6.6622e−006, A6 = 5.3253e−008, A8 = −3.0833e−010,
A10 = 5.9212e−013, A12 = 0.0000e+000, A14 = 0.0000e+000,
A16 = 0.0000e+000, A18 = 0.0000e+000, A20 = 0.0000e+000

Zoom data

| | WE | ST | TE |
|---|---|---|---|
| Focal length | 12.247 | 34.012 | 117.558 |
| Fno. | 3.900 | 5.500 | 6.200 |
| Angle of field 2ω | 85.3 | 35.3 | 10.6 |
| Image height | 10.09 | 11.15 | 11.15 |
| FB | 15.363 | 15.363 | 15.363 |
| Lens total length | 96.572 | 112.222 | 131.573 |
| d5 | 0.800 | 17.145 | 41.211 |
| d11 | 23.989 | 11.463 | 1.000 |
| d12 | 5.681 | 2.500 | 1.300 |
| d20 | 1.805 | 4.571 | 7.524 |
| d22 | 3.635 | 15.881 | 19.876 |

-continued

Unit mm

Unit focal length

| | | | |
|---|---|---|---|
| f1 = 78.1589 | f2 = −12.6372 | f3 = 15.9934 | f4 = −17.3903 |
| f5 = 37.4811 | | | |

| | |
|---|---|
| RRO/RCI | −0.723 |
| ft/fw | 9.599 |
| RCI | −27.8266 |
| RRO | 20.131 |

Example 6

Unit mm

Surface data

| Surface no. | r | d | nd | vd |
|---|---|---|---|---|
| Object plane | ∞ | ∞ | | |
| 1 | 53.869 | 1.400 | 2.00100 | 29.13 |
| 2 | 41.489 | 6.500 | 1.49700 | 81.61 |
| 3 | 385.670 | 0.100 | | |
| 4 | 55.990 | 3.651 | 1.49700 | 81.61 |
| 5 | 183.826 | Variable | | |
| 6 | 133.074 | 1.200 | 1.88300 | 40.76 |
| 7 | 13.000 | 6.752 | | |
| 8* | −22.448 | 1.100 | 1.72903 | 54.04 |
| 9* | 78.775 | 0.300 | | |
| 10 | 50.097 | 2.524 | 1.94595 | 17.98 |
| 11 | −118.907 | Variable | | |
| 12(stop) | ∞ | 1.000 | | |
| 13* | 10.006 | 3.182 | 1.49700 | 81.54 |
| 14* | 50.035 | 3.296 | | |
| 15 | 21.000 | 5.711 | 1.65100 | 56.16 |
| 16 | −8.556 | 0.800 | 1.88300 | 40.76 |
| 17 | 19.506 | 0.200 | | |
| 18* | 10.218 | 2.800 | 1.58313 | 59.38 |
| 19* | −47.461 | Variable | | |
| 20 | 50.425 | 1.000 | 1.69680 | 55.53 |
| 21 | 10.296 | 2.136 | | |
| 22* | −43.475 | 1.200 | 1.53071 | 55.69 |
| 23* | −98.704 | Variable | | |
| 24* | −236.932 | 4.726 | 1.49710 | 81.56 |
| 25* | −18.026 | 14.729 | | |
| Image plane (Light receiving surface) | ∞ | | | | stop surface 12

Aspherical surface data

8th surface

K = 0.0000
A4 = −3.5858e−005, A6 = 2.4861e−007, A8 = 4.9400e−009,
A10 = −3.3927e−011, A12 = 0.0000e+000, A14 = 0.0000e+000,
A16 = 0.0000e+000, A18 = 0.0000e+000, A20 = 0.0000e+000

9th surface

K = 0.0000
A4 = −4.1340e−005, A6 = 2.5590e−007, A8 = 4.4168e−009,
A10 = −3.1422e−011, A12 = 0.0000e+000, A14 = 0.0000e+000,
A16 = 0.0000e+000, A18 = 0.0000e+000, A20 = 0.0000e+000

13th surface

K = 0.0000
A4 = −5.2983e−005, A6 = 2.0253e−007, A8 = −1.2792e−008,
A10 = 2.8958e−010, A12 = −4.2500e−012, A14 = 0.0000e+000,
A16 = 0.0000e+000, A18 = 0.0000e+000, A20 = 0.0000e+000

14th surface

K = 0.0000
A4 = −6.2854e−005, A6 = 8.4558e−007, A8 = −1.8324e−008,
A10 = 2.5748e−010, A12 = −3.5919e−012, A14 = 0.0000e+000,
A16 = 0.0000e+000, A18 = 0.0000e+000, A20 = 0.0000e+000

-continued

Unit mm

18th surface

K = 0.0000
A4 = −2.1016e−004, A6 = 2.4063e−006, A8 = −4.7736e−008,
A10 = 2.1412e−010, A12 = 0.0000e+000, A14 = 0.0000e+000,
A16 = 0.0000e+000, A18 = 0.0000e+000, A20 = 0.0000e+000
19th surface K = 0.0000
A4 = 1.3521e−004, A6 = 2.7443e−006, A8 = −4.1225e−008,
A10 = 4.3064e−010, A12 = 0.0000e+000, A14 = 0.0000e+000,
A16 = 0.0000e+000, A18 = 0.0000e+000, A20 = 0.0000e+000
22th surface K = 0.0000
A4 = −9.6701e−005, A6 = −6.1207e−006, A8 = −1.9986e−008,
A10 = −8.1834e−010, A12 = 0.0000e+000, A14 = 0.0000e+000,
A16 = 0.0000e+000, A18 = 0.0000e+000, A20 = 0.0000e+000
23th surface K = 0.0000
A4 = −9.4077e−005, A6 = −5.7209e−006, A8 = 2.0088e−008,
A10 = −6.4909e−010, A12 = 0.0000e+000, A14 = 0.0000e+000,
A16 = 0.0000e+000, A18 = 0.0000e+000, A20 = 0.0000e+000
24th surface K = 0.0000
A4 = −8.6723e−005, A6 = 3.9573e−007, A8 = 1.7241e−010,
A10 = −4.8654e−012, A12 = 0.0000e+000, A14 = 0.0000e+000,
A16 = 0.0000e+000, A18 = 0.0000e+000, A20 = 0.0000e+000
25th surface K = 0.0000
A4 = −6.4671e−005, A6 = 2.1758e−007, A8 = 1.5033e−009,
A10 = −7.8307e−012, A12 = 0.0000e+000, A14 = 0.0000e+000,
A16 = 0.0000e+000, A18 = 0.0000e+000, A20 = 0.0000e+000

Zoom data

|  | WE | ST | TE |
|---|---|---|---|
| Focal length | 12.253 | 34.010 | 146.736 |
| Fno. | 3.900 | 5.500 | 6.200 |
| Angle of field 2ω | 84.5 | 35.3 | 8.4 |
| Image height | 10.04 | 11.15 | 11.15 |
| FB | 14.729 | 14.729 | 14.729 |
| Lens total length | 98.582 | 119.487 | 144.808 |
| d5 | 0.500 | 18.216 | 50.139 |
| d11 | 30.131 | 15.295 | 1.200 |
| d19 | 1.852 | 3.902 | 7.988 |
| d23 | 1.792 | 17.765 | 21.173 |

Unit focal length f1 = 88.0183  f2 = −12.6816  f3 = 16.493  f4 = −16.5079
f5 = 38.9681

| RRO/RCI | 0.524 |
|---|---|
| ft/fw | 11.976 |
| RCI | 19.5062 |
| RRO | 10.2181 |

Example 7

Unit mm

Surface data

| Surface no. | r | d | nd | vd |
|---|---|---|---|---|
| Object plane | ∞ | ∞ | | |
| 1 | 55.721 | 1.400 | 1.84666 | 23.78 |
| 2 | 39.622 | 4.900 | 1.60300 | 65.44 |
| 3 | 193.303 | 0.100 | | |
| 4 | 43.537 | 3.200 | 1.59282 | 68.63 |
| 5 | 104.731 | Variable | | |
| 6 | 44.895 | 1.200 | 1.88300 | 40.76 |
| 7 | 9.906 | 4.677 | | |
| 8* | −18.462 | 1.100 | 1.72903 | 54.04 |
| 9* | 35.951 | 0.100 | | |
| 10 | 28.542 | 1.800 | 1.94595 | 17.98 |
| 11 | −346.262 | Variable | | |
| 12(stop) | ∞ | Variable | | |
| 13* | 9.112 | 4.696 | 1.58313 | 59.38 |
| 14* | −23.980 | 0.100 | | |
| 15 | 48.514 | 2.926 | 1.49700 | 81.61 |
| 16 | −11.614 | 0.700 | 1.90366 | 31.32 |
| 17 | 13.996 | 2.000 | 1.81474 | 37.03 |
| 18* | −34.396 | Variable | | |
| 19* | −72.173 | 0.800 | 1.53071 | 55.69 |
| 20* | 13.592 | Variable | | |
| 21* | −94.682 | 4.800 | 1.53071 | 55.69 |
| 22* | −19.005 | 16.911 | | |
| Image plane (Light receiving surface) | ∞ | | | | stop surface 12

Aspherical surface data

8th surface

K = 0.0000
A4 = −3.4799e−004, A6 = 8.8145e−006, A8 = −1.3878e−007,
A10 = 1.2747e−009, A12 = 0.0000e+000, A14 = 0.0000e+000,
A16 = 0.0000e+000, A18 = 0.0000e+000, A20 = 0.0000e+000
9th surface K = 0.0000
A4 = −3.3105e−004, A6 = 9.8427e−006, A8 = −1.6282e−007,
A10 = 1.5910e−009, A12 = 0.0000e+000, A14 = 0.0000e+000,
A16 = 0.0000e+000, A18 = 0.0000e+000, A20 = 0.0000e+000
13th surface K = 0.0000
A4 = −4.5382e−005, A6 = −8.8847e−007, A8 = 6.3227e−009,
A10 = 1.7632e−010, A12 = −1.3110e−011, A14 = 0.0000e+000,
A16 = 0.0000e+000, A18 = 0.0000e+000, A20 = 0.0000e+000
14th surface K = 0.0000
A4 = 1.1624e−004, A6 = −2.6691e−006, A8 = 7.0485e−009,
A10 = 4.7389e−010, A12 = −1.2123e−011, A14 = 0.0000e+000,
A16 = 0.0000e+000, A18 = 0.0000e+000, A20 = 0.0000e+000
18th surface K = 0.0000
A4 = 1.7182e−004, A6 = 6.4707e−006, A8 = −7.0200e−008,
A10 = 4.1778e−009, A12 = 0.0000e+000, A14 = 0.0000e+000,
A16 = 0.0000e+000, A18 = 0.0000e+000, A20 = 0.0000e+000
19th surface K = 0.0000
A4 = 2.5249e−004, A6 = −8.8999e−006, A8 = −1.6699e−007,
A10 = 8.0079e−009, A12 = 0.0000e+000, A14 = 0.0000e+000,
A16 = 0.0000e+000, A18 = 0.0000e+000, A20 = 0.0000e+000
20th surface K = 0.0000
A4 = 3.0911e−004, A6 = −1.2276e−005, A8 = −1.9881e−008,
A10 = 4.6193e−009, A12 = 0.0000e+000, A14 = 0.0000e+000,
A16 = 0.0000e+000, A18 = 0.0000e+000, A20 = 0.0000e+000
21th surface K = 0.0000
A4 = 3.0206e−005, A6 = 9.8351e−008, A8 = 2.0669e−009,
A10 = −2.6629e−011, A12 = 0.0000e+000, A14 = 0.0000e+000,
A16 = 0.0000e+000, A18 = 0.0000e+000, A20 = 0.0000e+000

-continued

Unit mm

22th surface

K = 0.0000
A4 = 3.0043e−005, A6 = −1.5829e−007, A8 = 5.3849e−009,
A10 = −3.4200e−011, A12 = 0.0000e+000, A14 = 0.0000e+000,
A16 = 0.0000e+000, A18 = 0.0000e+000, A20 = 0.0000e+000

Zoom data

| | WE | ST | TE |
|---|---|---|---|
| Focal length | 14.294 | 35.011 | 97.915 |
| Fno. | 3.900 | 5.500 | 6.000 |
| Angle of field 2ω | 76.0 | 34.3 | 12.9 |
| Image height | 10.19 | 11.15 | 11.15 |
| FB | 16.911 | 16.911 | 16.911 |
| Lens total length | 72.182 | 92.457 | 114.572 |
| d5 | 0.679 | 16.881 | 36.839 |
| d11 | 11.074 | 6.361 | 1.000 |
| d12 | 3.543 | 1.000 | 1.000 |
| d18 | 1.205 | 3.937 | 5.481 |
| d20 | 4.273 | 12.870 | 18.844 |

Unit focal length f1 = 71.5553   f2 = −10.2455   f3 = 12.7009   f4 = −21.4827
f5 = 43.8409

| RRO/RCI | 1.000 |
|---|---|
| ft/fw | 6.850 |
| RCI | 13.9957 |
| RRO | 13.9957 |

FIGS. 8A to 8L are aberration diagrams of the zoom lens according to the first embodiment in the state in which the zoom lens is focused on an object point at infinity. FIGS. 8A, 8B, 8C, and 8D respectively show spherical aberration (SA), astigmatism (AS), distortion (DT), and chromatic aberration of magnification (CC) of the zoom lens at the wide angle end. FIGS. 8E, 8F, 8G, and 8H respectively show spherical aberration, astigmatism, distortion, and chromatic aberration of magnification of the zoom lens in the intermediate focal length state. FIGS. 8I, 8J, 8K, and 8L respectively show spherical aberration, astigmatism, distortion, and chromatic aberration of magnification of the zoom lens at the telephoto end.

FIGS. 9A to 9L are aberration diagrams of the zoom lens according to the second embodiment in the state in which the zoom lens is focused on an object point at infinity. FIGS. 9A, 9B, 9C, and 9D respectively show spherical aberration, astigmatism, distortion, and chromatic aberration of magnification of the zoom lens at the wide angle end. FIGS. 9E, 9F, 9G, and 9H respectively show spherical aberration, astigmatism, distortion, and chromatic aberration of magnification of the zoom lens in the intermediate focal length state. FIGS. 9I, 9J, 9K, and 9L respectively show spherical aberration, astigmatism, distortion, and chromatic aberration of magnification of the zoom lens at the telephoto end.

FIGS. 10A to 10L are aberration diagrams of the zoom lens according to the third embodiment in the state in which the zoom lens is focused on an object point at infinity. FIGS. 10A, 10B, 10C, and 10D respectively show spherical aberration, astigmatism, distortion, and chromatic aberration of magnification of the zoom lens at the wide angle end. FIGS. 10E, 10F, 10G, and 10H respectively show spherical aberration, astigmatism, distortion, and chromatic aberration of magnification of the zoom lens in the intermediate focal length state. FIGS. 10I, 10J, 10K, and 10L respectively show spherical aberration, astigmatism, distortion, and chromatic aberration of magnification of the zoom lens at the telephoto end.

FIGS. 11A to 11L are aberration diagrams of the zoom lens according to the fourth embodiment in the state in which the zoom lens is focused on an object point at infinity. FIGS. 11A, 11B, 11C, and 11D respectively show spherical aberration, astigmatism, distortion, and chromatic aberration of magnification of the zoom lens at the wide angle end. FIGS. 11E, 11F, 11G, and 11H respectively show spherical aberration, astigmatism, distortion, and chromatic aberration of magnification of the zoom lens in the intermediate focal length state. FIGS. 11I, 11J, 11K, and 11L respectively show spherical aberration, astigmatism, distortion, and chromatic aberration of magnification of the zoom lens at the telephoto end.

FIGS. 12A to 12L are aberration diagrams of the zoom lens according to the fifth embodiment in the state in which the zoom lens is focused on an object point at infinity. FIGS. 12A, 12B, 12C, and 12D respectively show spherical aberration, astigmatism, distortion, and chromatic aberration of magnification of the zoom lens at the wide angle end. FIGS. 12E, 12F, 12G, and 12H respectively show spherical aberration, astigmatism, distortion, and chromatic aberration of magnification of the zoom lens in the intermediate focal length state. FIGS. 12I, 12J, 12K, and 12L respectively show spherical aberration, astigmatism, distortion, and chromatic aberration of magnification of the zoom lens at the telephoto end.

FIGS. 13A to 13L are aberration diagrams of the zoom lens according to the sixth embodiment in the state in which the zoom lens is focused on an object point at infinity. FIGS. 13A, 13B, 13C, and 13D respectively show spherical aberration, astigmatism, distortion, and chromatic aberration of magnification of the zoom lens at the wide angle end. FIGS. 13E, 13F, 13G, and 13H respectively show spherical aberration, astigmatism, distortion, and chromatic aberration of magnification of the zoom lens in the intermediate focal length state. FIGS. 13I, 13J, 13K, and 13L respectively show spherical aberration, astigmatism, distortion, and chromatic aberration of magnification of the zoom lens at the telephoto end.

FIGS. 14A to 14L are aberration diagrams of the zoom lens according to the seventh embodiment in the state in which the zoom lens is focused on an object point at infinity. FIGS. 14A, 14B, 14C, and 14D respectively show spherical aberration, astigmatism, distortion, and chromatic aberration of magnification of the zoom lens at the wide angle end. FIGS. 14E, 14F, 14G, and 14H respectively show spherical aberration, astigmatism, distortion, and chromatic aberration of magnification of the zoom lens in the intermediate focal length state. FIGS. 14I, 14J, 14K, and 14L respectively show spherical aberration, astigmatism, distortion, and chromatic aberration of magnification of the zoom lens at the telephoto end.

In these diagrams, "FIY" represents the largest image height. In the second to seventh embodiments, off-axis aberrations are shown up to an image height 0.3 mm larger than the effective image pickup area.

Next, parameter and values of conditional expressions in each embodiments are described.

"lower limit" through "upper limit"

| LTLw/IHt | 3.5 through 8.9 (or 10) |
|---|---|
| |f2/IHt| | 0.5 through 1.3 |

-continued

| | |
|---|---|
| f3/IHt | 0.7 through 2.0 |
| f3/fw | 0.6 through 1.6 |
| f1/fw | 4.0 through 8.5 |
| vd2p | 13 through 23 |
| DTw | −18 through −6.0 |
| vd1p | 62 (or 65) and above |
| θF2p | 0.62 through 0.69 |
| ωw | 40 through 50 |

| | Example 1 | Example 2 | Example 3 | Example 4 |
|---|---|---|---|---|
| LTLw/IHt | 5.568 | 5.747 | 6.284 | 8.571 |
| \|f2/IHt\| | 0.674 | 0.696 | 0.783 | 1.045 |
| f3/IHt | 1.015 | 1.033 | 1.113 | 1.405 |
| f3/fw | 0.924 | 0.941 | 1.013 | 1.279 |
| f1/fw | 5.0454 | 5.18592 | 5.56553 | 6.28613 |
| vd2p | 17.98 | 17.98 | 17.98 | 17.98 |
| (material) | FDS18 | FDS18 | FDS18 | FDS18 |
| DTw | −10.717 | −10.992 | −9.826 | −9.33 |
| vd1p | 63.33 | 63.33 | 81.61 | 81.61 |
| | 65.44 | 63.33 | 81.61 | 65.44 |
| (material) | S-PHM52 | S-PHM52 | FCD1 | FCD1 |
| (material) | S-PHM53 | S-PHM52 | FCD1 | S-PHM53 |
| θgF2p | 0.6544 | 0.6544 | 0.6544 | 0.6544 |
| (material) | FDS18 | FDS18 | FDS18 | FDS18 |
| ωw | 42.515 | 42.596 | 42.305 | 42.278 |

| | Example 5 | Example 6 | Example 7 |
|---|---|---|---|
| LTLw/IHt | 8.661 | 8.841 | 6.474 |
| \|f2/IHt\| | 1.133 | 1.137 | 0.919 |
| f3/IHt | 1.434 | 1.479 | 1.139 |
| f3/fw | 1.306 | 1.346 | 0.889 |
| f1/fw | 6.3817 | 7.18349 | 5.00601 |
| vd2p | 18.9 | 17.98 | 17.98 |
| (material) | S-NPH2 | FDS18 | FDS18 |
| DTw | −11.109 | −9.718 | −10.177 |
| vd1p | 81.61 | 81.61 | 65.44 |
| | 68.63 | 81.61 | 68.63 |
| (material) | FCD1 | FCD1 | S-PHM53 |
| (material) | FCD505 | FCD1 | FCD505 |
| θgF2p | 0.6495 | 0.6544 | 0.6544 |
| (material) | S-NPH2 | FDS18 | FDS18 |
| ωw | 42.629 | 42.269 | 38.012 |

(Digital Camera)

Figure 15:
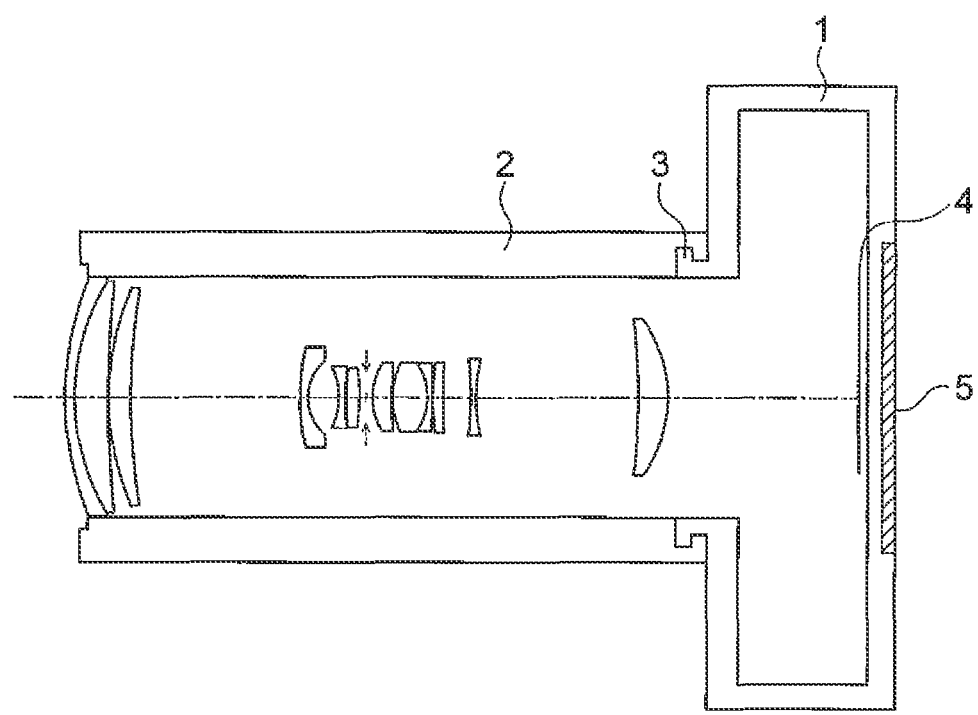
FIG. 15 is a cross sectional view of a single lens mirrorless camera as an electronic image pickup apparatus.

FIG. 15 is a cross sectional view of a single lens mirror-less camera as an electronic image pickup apparatus. In FIG. 15, a taking lens system 2 is provided in the lens barrel of the single lens mirror-less camera 1. The single lens mirror-less camera 1 has a mount portion 3 with which the taking lens system 2 can be detachably mounted on the body of the single lens mirror-less camera 1. The mount portion 3 may be a screw mount, a bayonet mount or the like. In this illustrative case, a bayonet mount is used. The body of the single lens mirror-less camera 1 is provided with a surface 4 of an image pickup element and a rear monitor 5. The image pickup element may be a small-size CCD or CMOS sensor.

As the taking lens system 2 of the single lens mirror-less camera 1, an internal focusing lens system according to the present invention, for example, a lens system according to one of the first to seventh embodiments is used.

Figure 16:
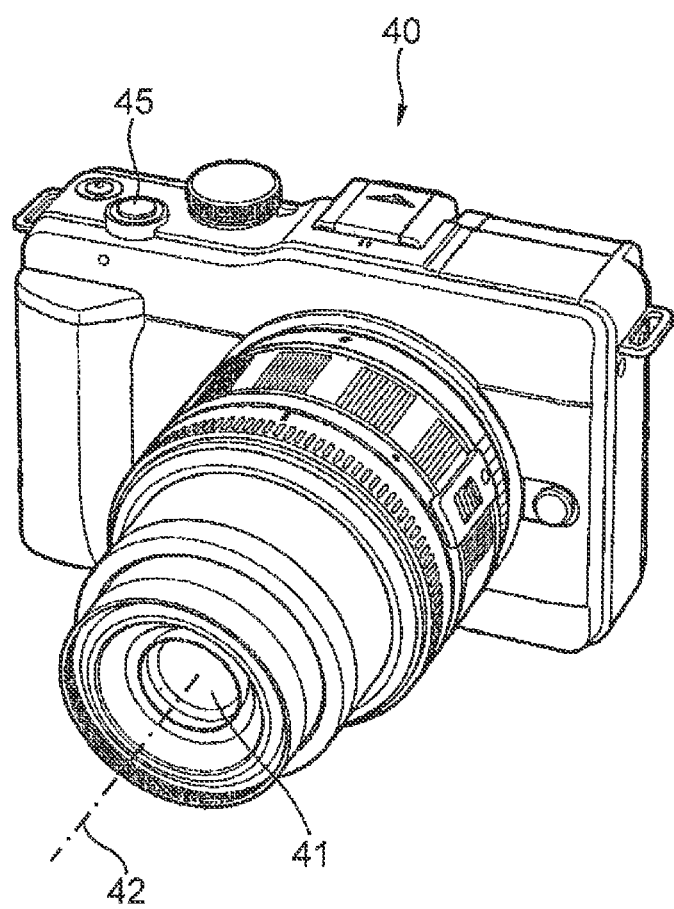
FIG. 16 is a front perspective view showing the outer appearance of a digital camera as an image pickup apparatus.
Figure 17:
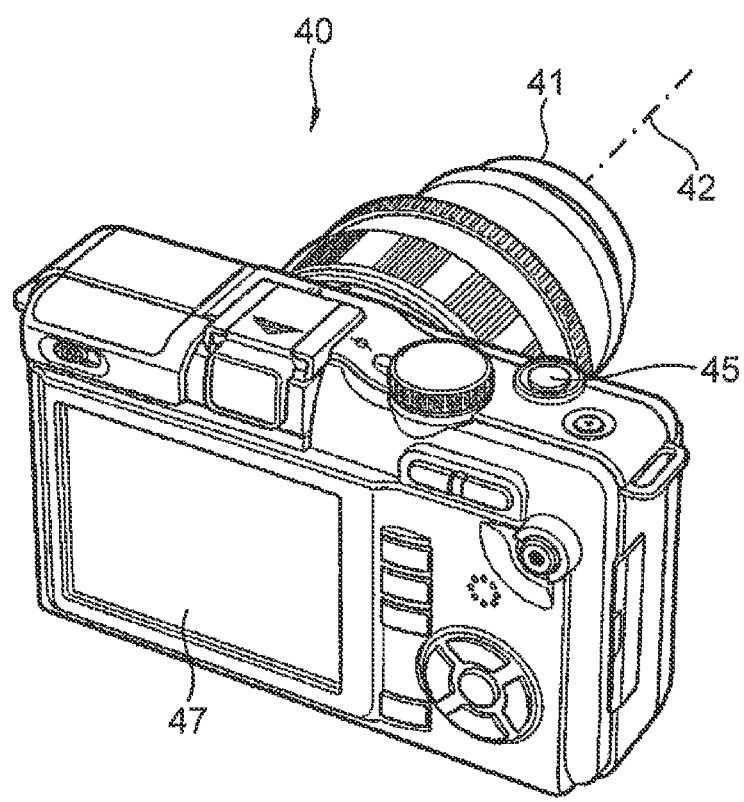
FIG. 17 is a rear perspective view showing the outer appearance of the digital camera as an image pickup apparatus.

FIGS. 16 and 17 schematically show the construction of an image pickup apparatus according to the present invention. FIG. 16 is a front perspective view showing the outer appearance of a digital camera 40 as the image pickup apparatus. FIG. 17 is a rear perspective view of the digital camera 40. In this digital camera 40, an internal focusing lens system according to the present invention is used as the taking optical system 41.

The digital camera 40 according to this embodiment has the taking optical system 41 arranged in the taking optical path 42, a shutter release button 45, and a liquid crystal display monitor 47. In response to depression of the shutter release button 45 provided on the top of the digital camera 40, shooting through the taking optical system 41, e.g. the internal focusing lens system according to the first embodiment, is effected. Specifically, an image of an object is formed by the taking optical system 41 on the image pickup element (photoelectric conversion surface) provided in the vicinity of the image plane. The image of the object picked up by the image pickup element is processed by a processing unit and displayed as an electronic image on the liquid crystal display monitor 47 provided on the back of the camera. The picked-up electronic image can be stored in a storage unit.

(Internal Circuit Configuration)

Figure 18:
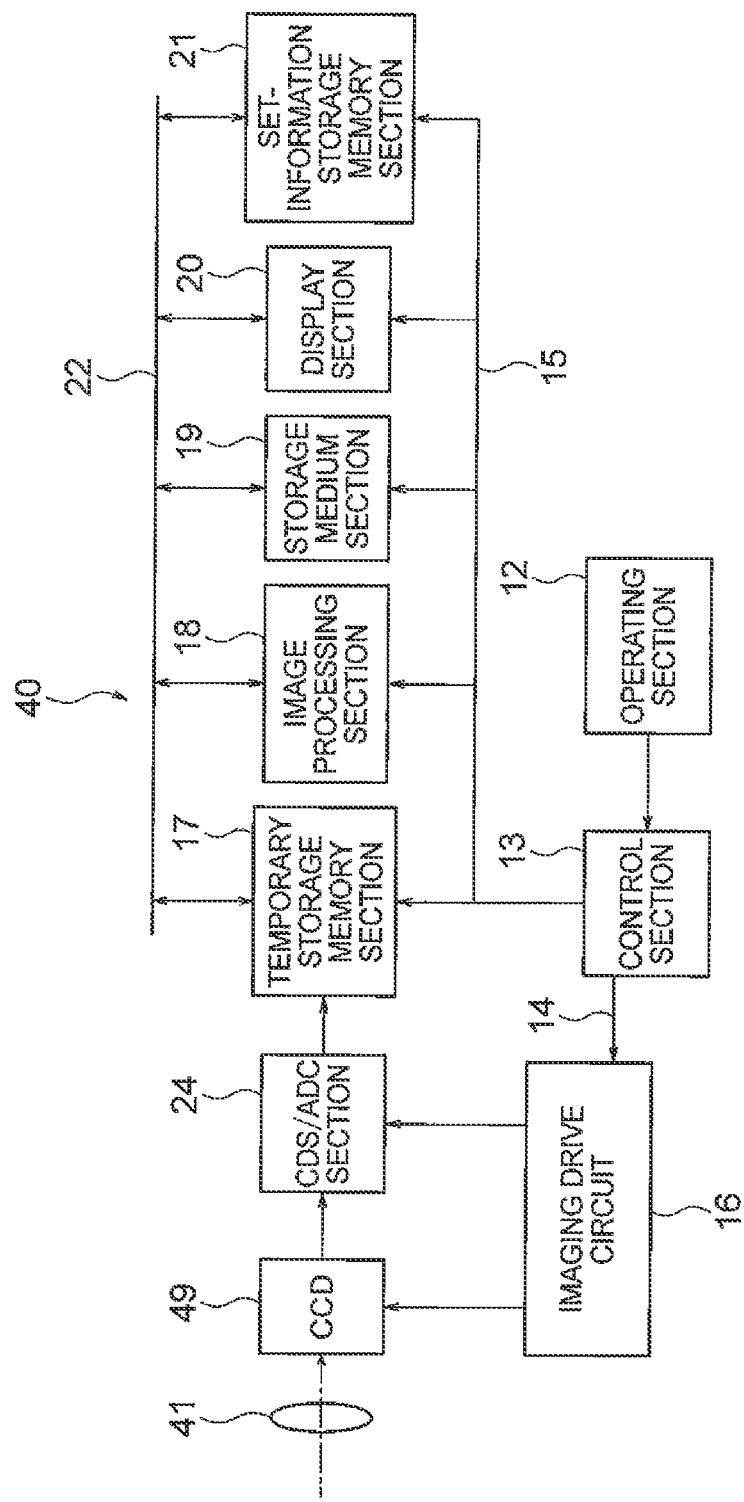
FIG. 18 is a block diagram showing the relevant interval circuit configuration of the digital camera.

FIG. 18 is a block diagram showing the relevant internal circuit of the digital camera 40. In the case described hereinafter, the processing unit mentioned above includes, for instance, a CDS/ADC section 24, a temporary storage memory 17, and an image processing section 18, and the storage unit includes a storage medium 19 for example.

As shown in FIG. 18, the digital camera 40 has an operating section 12 and a control section 13 connected to the operating section 12. The digital camera 40 also has an image pickup drive circuit 16, the temporary storage memory 17, the image processing section 18, the storage medium 19, a display section 20, and a set-information storage memory section 21, which are connected to control signal output ports of the control section 13 via buses 14 and 15.

The temporary storage memory 17, the image processing section 18, the storage medium section 19, the display section 20, and the set-information storage memory section 21 are configured to be capable of mutually inputting and outputting data via a bus 22. Moreover, a CCD 49 and the CDS/ADC section 24 are connected to the image pickup drive circuit 16.

The operating section 12 is equipped with various entry buttons and switches and notifies the control section 13 of event information entered from outside (by a user of the camera) through the entry buttons and switches. The control section 13 is a central processing device such as a CPU and has a built-in program memory, which is not shown in the drawings. The control section 13 performs overall control of the digital camera 40 according to a program stored in the program memory.

The CCD 49 is an image pickup element that is driven and controlled by the image pickup drive circuit 16 to convert the quantity of light of the object image formed through the taking optical system 41 into an electrical signal on a pixel-by-pixel basis and to output it to the CDS/ADC section 24.

The CDS/ADC section 24 is a circuit that amplifies the electrical signals input from the CCD 49, performs analog-to-digital conversion, and outputs to the temporary storage memory 17 raw image data (or Bayer data, which will be hereinafter referred to as "RAW data") that has undergone only amplification and digital conversion.

The temporary storage memory 17 may include, for example, an SDRAM, which serves as a buffer. The temporary storage memory 17 is a memory device that temporarily stores the RAW data output from the CDS/ADC section 24. The image processing section 18 is a circuit that retrieves RAW data stored in the temporary storage memory 17 or RAW data stored in the storage medium section 19 and performs various electrical image processing including distortion correction based on image quality parameters specified by the control section 13.

The storage medium section 19 allows a detachable mounting of a recording medium such as, for example, a card-type or stick-type flash memory. The storage medium section 19 records or writes RAW data transferred from the temporary storage memory 17 and image data having been processed in the image processing section 18 in the flash memory to have the data stored in it.

The display section 20 includes the liquid-crystal display monitor 47 and displays images based on picked-up RAW data, image data, and operation menu etc. The set-information storage memory section 21 includes a ROM section in which various image quality parameters are stored in advance and a RAM section for storing image quality parameters readout from the ROM section in response to an entry(ies) made through the operating section 12.

The digital camera 40 having the above-described construction uses as the taking optical system 41 an internal focusing lens system according to the present invention. Thus, the digital camera 40 can be an image pickup apparatus that is advantageous in producing high resolution images without deterioration in image quality, while having a wide angle of view and being small in size.

Figure 19:
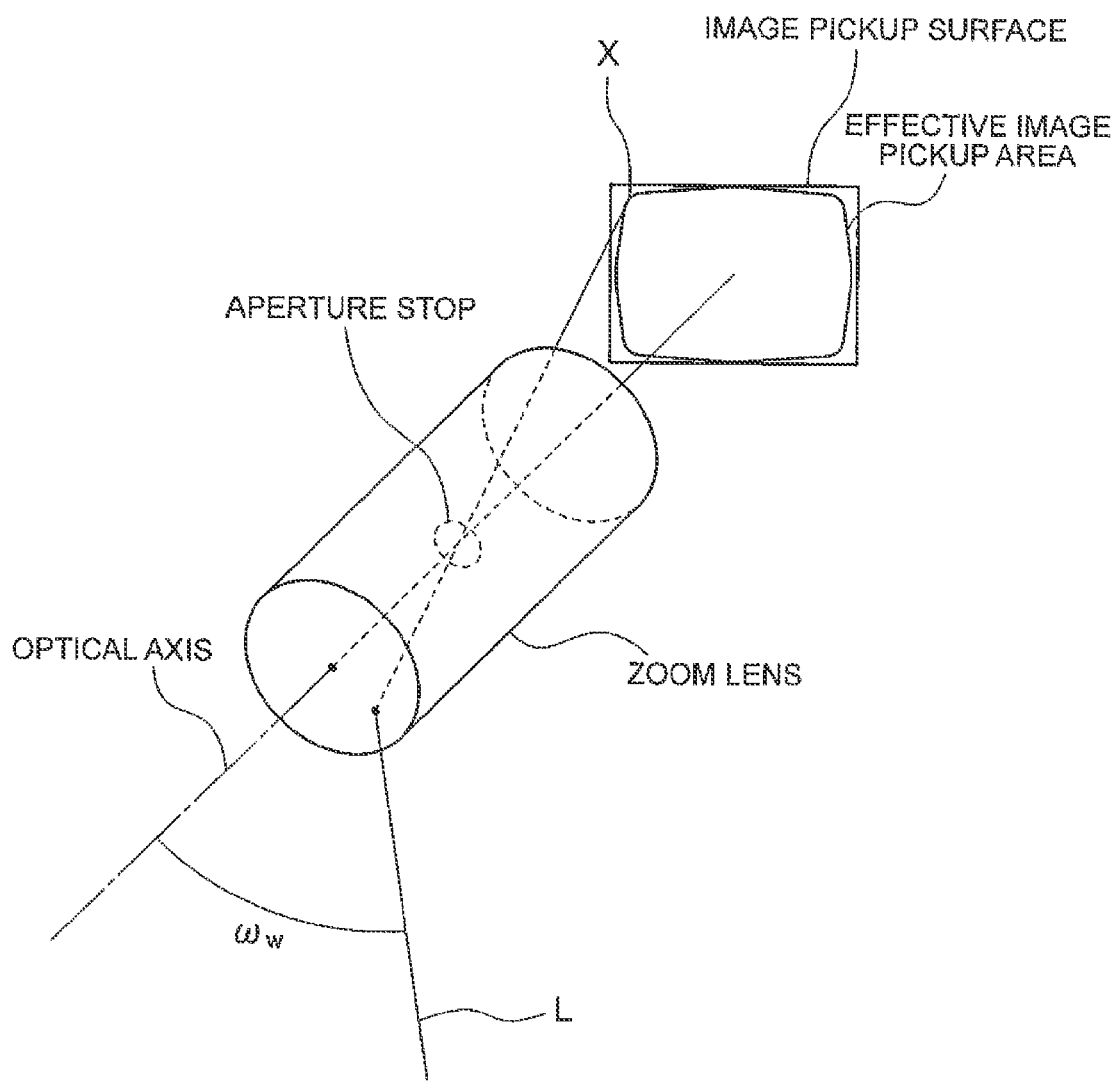
FIG. 19 is a diagram illustrating angle cow.

Angle ωw (the largest half angle of view of a zoom lens at the wide angle end in the state in which the zoom lens is focused on an object at infinity) will be described with reference to FIG. 19. FIG. 19 shows a zoom lens, an aperture stop, and an image pickup surface arranged on an optical axis.

In FIG. 19, ray L (solid line) passes the center of the aperture stop and reaches point X on the effective image pickup area. This point X is a point farthest from the optical axis in the effective image pickup area. Here, the effective image pickup area is an area in which an image of an object is formed, and point X is at a position of the largest image height. Namely, the ray L passes the center of the aperture stop and is incident on the effective image pickup area at a position of the largest image height. Angle ωw is the half angle of view with the ray L relative to the optical axis at the wide angle end of the focal length range.

As will be understood from the foregoing description, the zoom lens according to the present invention is useful in achieving size reduction while attaining a wide angle of view and a high zoom ratio.

The present invention can provide a zoom lens which can be made small in size and have a wide angle of view and a sufficiently high zoom ratio, and an image pickup apparatus equipped with such a zoom lens.

What is claimed is:

1. A zoom lens comprising, in order from the object side to the image side:

a first lens unit having a positive refractive power;
a second lens unit having a negative refractive power;
a third lens unit having a positive refractive power;
a fourth lens unit having a negative refractive power; and
a fifth lens unit having a positive refractive power,
wherein the zoom lens has an aperture stop arranged between the second lens unit and the fourth lens unit,
during zooming from the wide angle end to the telephoto end, the distances between the lens units vary in such a way that the distance between the first lens unit and the second lens unit is larger at the telephoto end than at the wide angle end, the distance between the second lens unit and the third lens unit is smaller at the telephoto end than at the wide angle end, and the distance between the fourth lens unit and the fifth lens unit is larger at the telephoto end than at the wide angle end,
and
the zoom lens satisfies the following conditional expression (3):

$$0.5 \leq |f_2/IH_t| \leq 1.3 \quad (3),$$

where $f_2$ is the focal length of the second lens unit, and $IH_t$ is the largest image height of the zoom lens at the telephoto end in the state in which the zoom lens is focused at infinity on the optical axis.

2. A zoom lens according to claim 1, wherein the third lens unit includes a negative lens and a plurality of positive lenses.

3. A zoom lens according to claim 1, wherein the zoom lens satisfies the following conditional expression (2):

$$3.5 \leq |LTL_w/IH_t| \leq 10.0 \quad (2),$$

where $LTL_w$ is the sum of the distance on the optical axis between the refractive surface closest to the object side and the refractive surface closest to the image side among the refractive surfaces in the zoom lens and the equivalent air distance of the back focus at the wide angle end in the state in which the zoom lens is focused at infinity on the optical axis, and $IH_t$ is the largest image height at the telephoto end in the state in which the zoom lens is focused at infinity on the optical axis.

4. A zoom lens according to claim 1, wherein the zoom lens satisfies the following conditional expression (4):

$$0.7 \leq f_3/IH_t \geq 2.0 \quad (4),$$

where $f_3$ is the focal length of the third lens unit, and $IH_t$ is the largest image height of the zoom lens at the telephoto end in the state in which the zoom lens is focused at infinity on the optical axis.

5. A zoom lens according to claim 1, wherein the zoom lens satisfies the following conditional expression (5):

$$0.6 \leq f_3/f_w \leq 1.6 \quad (5),$$

where $f_3$ is the focal length of the third lens unit, and $f_w$ is the focal length of the zoom lens at the wide angle end in the state in which the zoom lens is focused at infinity on the optical axis.

6. The zoom lens according to claim 1, wherein the zoom lens satisfies the following conditional expression (6):

$$4.0 \leq f_1/f_w \leq 8.5 \quad (6),$$

where $f_1$ is the focal length of the first lens unit, and $f_w$ is the focal length of the zoom lens at the wide angle end in the state in which the zoom lens is focused at infinity on the optical axis.

7. The zoom lens according to claim 1, wherein the second lens unit satisfies the following conditional expression (7):

$$13 \leq v_{d2p} \leq 23 \quad (7),$$

where $v_{d2p}$ is the Abbe constant of the positive lens in the second lens unit.

8. The zoom lens according to claim 1, wherein the zoom lens satisfies the following conditional expression (8):

$$-18.0\% \leq DT_w \leq -6.0\% \quad (8),$$

where $DT_w = \{IH_w - f_w \times \tan(\omega_w)\}/\{f_w \times \tan(\omega_w)\} \times 100(\%)$, where $f_w$ is the focal length of the zoom lens at the wide angle end in the state in which the zoom lens is focused at infinity on the optical axis, $IH_w$ is the largest image height at the wide angle end in the state in which the zoom lens is focused at infinity on the optical axis, and $w$, is the half angle of view of the zoom lens at the wide angle end in the state in which the zoom lens is focused at infinity on the optical axis.

9. The zoom lens according to claim 1, wherein the second lens unit comprises, in order from the object side, a first negative lens component having a negative refractive power, a second negative lens component having a negative refractive power, and a positive lens component having a positive refractive power, and the total number of the lens components included in the second lens unit is three, where the term "lens component" refers to a lens block whose refractive surfaces that are in contact with air on the optical axis include only two surfaces or an object side surface and an image side surface.

10. The zoom lens according to claim 9, wherein the first negative lens component, the second negative lens component, and the positive lens component in the second lens unit are single lenses.

11. The zoom lens according to claim 1, wherein the third lens unit comprises two lenses cemented together with the cemented surface having a negative refractive power, an object side positive lens located closer to the object side than the two lenses, an image side lens located closer to the image side than the two lenses.

12. The zoom lens according to claim 11, wherein a composite refractive power of a portion from the object side surface of the third lens unit to the image side surface of a lens located immediately on the object side of the two lenses is positive.

13. The zoom lens according to claim 11, the image side lens in the third lens unit is a positive lens.

14. The zoom lens according to claim 11, wherein the two lenses and the image side lens constitute a cemented triplet lens.

15. The zoom lens according to claim 11 wherein the image side lens is a positive lens, and the composite refractive power of a portion from the object side surface of the lens located immediately on the image side of the two lenses to the image side surface of the third lens unit is positive.

16. The zoom lens according to claim 11 wherein the composite refractive power of a portion from the object side surface of the lens located immediately on the image side of the two lenses to the image side surface of the third lens unit is negative.

17. The zoom lens according to claim 1, wherein the first lens unit comprises, in order from the object side to the image side, a negative lens, a first positive lens, and a second positive lens.

18. The zoom lens according to claim 17, wherein the negative lens and the first positive lens in the first lens unit are cemented together.

19. The zoom lens according to claim 1, wherein the first lens unit includes a positive lens, and all the positive lenses in the first lens unit satisfy the following conditional expression (9):

$$v_{d1p} > 62 \quad (9),$$

where $v_{d1p}$ is the Abbe constant of each of the positive lenses in the first lens unit.

20. The zoom lens according to claim 1, wherein any one of the positive lenses in the first lens unit satisfies the following conditional expression (10):

$$v_{d1p} > 65 \quad (10),$$

where $v_{d1p}$ is the Abbe constant of the positive lens in the first lens unit.

21. The zoom lens according to claim 1, wherein the second lens unit includes a positive lens that satisfies the following conditional expression (11):

$$0.620 \leq \theta_{gF2p} \leq 0.690 \quad (11),$$

where $\theta_{gF2p} = (n_{g2p} - n_{F2p})/(n_{F2p} - n_{C2p})$, where $n_{g2p}$ is the refractive index of the positive lens in the second lens unit with respect to the g-line, $n_{F2p}$ is the refractive index of the positive lens in the second lens unit with respect to the F-line, and $n_{C2p}$ is the refractive index of the positive lens in the second lens unit with respect to the C-line.

22. The zoom lens according to claim 11, wherein a lens located immediately on the image side of the two lenses in the third lens unit has an object side surface convex toward the object side and satisfies the following conditional expression (12):

$$R_{RO}/R_{CI} \leq 1 \quad (12),$$

where $R_{RO}$ is the paraxial radius of curvature of the object side surface of the lens located immediately on the image side the two lenses, and $R_{CI}$ is the paraxial radius of curvature of the image side surface of the image side lens among the two lenses in the third lens unit.

23. The zoom lens according to claim 1, wherein the zoom lens satisfies the following conditional expression (13):

$$37° \leq \omega_w \leq 50° \quad (13),$$

where $\omega_w$ is the half angle of view of the zoom lens at the wide angle end in the state in which the zoom lens is focused at infinity on the optical axis.

24. The zoom lens according to claim 1, wherein the zoom lens satisfies the following conditional expression (14):

$$4.5 \leq f_t/f_w \quad (14),$$

where $f_w$ is the focal length of the zoom lens at the wide angle end in the state in which the zoom lens is focused at infinity on the optical axis, and $f_t$ is the focal length of the zoom lens at the telephoto end in the state in which the zoom lens is focused at infinity on the optical axis.

25. The zoom lens according to claim 1, wherein the third lens unit includes a negative lens and a plurality of positive lenses.

26. The zoom lens according to claim 1, wherein the fifth lens unit is kept stationary during zooming from the wide angle end to the telephoto end, and the fourth lens unit moves toward the image side for focusing from infinity to an object at a close distance.

27. An image pickup apparatus comprising:
a zoom lens according to claim 1; and
an image pickup element arranged on the image side of the zoom lens to convert an image formed by the zoom lens into an electric signal.

28. An image pickup apparatus comprising:
a zoom lens according to claim 1; and
an image pickup element arranged on the image side of the zoom lens to convert an image formed by the zoom lens into an electric signal, wherein
the third lens unit comprises two lenses cemented together with the cemented surface having a negative refractive power,
an object side positive lens located closer to the object side than the two lenses, an image side lens located closer to the image side than the two lenses,
the image side lens located immediately on the image side of the two lenses in the third lens unit has an object side surface convex toward the object side, the image side lens in the third lens unit located closer to the image side than the two lenses is shifted eccentrically relative to the two lenses in order to prevent image blur, and the zoom lens satisfies the following conditional expression (15):

$$R_{RO}/R_{CI} \leq 1 \quad (15),$$

where $R_{RO}$ is the paraxial radius of curvature of the object side surface of the image side lens located immediately after the two lenses in the third lens unit, and $R_{CI}$ is the paraxial radius of curvature of the image side surface of an image side lens among the two lenses in the third lens unit.

29. A zoom lens comprising, in order from the object side to the image side:
a first lens unit having a positive refractive power;
a second lens unit having a negative refractive power;
a third lens unit having a positive refractive power;
a fourth lens unit having a negative refractive power; and
a fifth lens unit having a positive refractive power,
wherein the zoom lens has an aperture stop arranged between the second lens unit and the fourth lens unit,
during zooming from the wide angle end to the telephoto end, the distances between the lens units vary in such a way that the distance between the first lens unit and the second lens unit is larger at the telephoto end than at the wide angle end, the distance between the second lens unit and the third lens unit is smaller at the telephoto end than at the wide angle end, and the distance between the fourth lens unit and the fifth lens unit is larger at the telephoto end than at the wide angle end, and the zoom lens satisfies the following conditional expression (2-1):

$$LTL_w/IH_t \leq 10.0 \quad (2\text{-}1),$$

where $LTL_w$ is the sum of the distance on the optical axis between the refractive surface closest to the object side and the refractive surface closest to the image side among the refractive surfaces in the zoom lens and the equivalent air distance of the back focus at the wide angle end in the state in which the zoom lens is focused at infinity on the optical axis, and $IH_t$ is the largest image height at the telephoto end in the state in which the zoom lens is focused at infinity on the optical axis.

* * * * *